(12) United States Patent
Yamashita et al.

(10) Patent No.: US 8,483,576 B2
(45) Date of Patent: Jul. 9, 2013

(54) DRIVING METHOD AND DRIVING APPARATUS FOR OPTICAL MODULATOR, AND OPTICAL TRANSMITTER USING SAME

(75) Inventors: Shinji Yamashita, Kawasaki (JP); Naoki Hashimoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 479 days.

(21) Appl. No.: 12/659,982

(22) Filed: Mar. 26, 2010

(65) Prior Publication Data

US 2010/0254715 A1    Oct. 7, 2010

(30) Foreign Application Priority Data

Apr. 6, 2009  (JP) .................................. 2009-092087

(51) Int. Cl.
*H04B 10/04*    (2006.01)
(52) U.S. Cl.
USPC ............................ 398/188; 389/198; 359/279
(58) Field of Classification Search
USPC ............... 398/182–201; 359/279, 237, 238, 359/239, 280
See application file for complete search history.

(56) References Cited

U.S. PATENT DOCUMENTS

| | | | | |
|---|---|---|---|---|
| 5,170,274 | A * | 12/1992 | Kuwata et al. ................. | 398/198 |
| 2002/0015212 | A1 | 2/2002 | Fujiwara et al. | |
| 2003/0147577 | A1 | 8/2003 | Kataoka et al. | |
| 2003/0184838 | A1 | 10/2003 | Akiyama et al. | |
| 2003/0185575 | A1 | 10/2003 | Ikeuchi | |
| 2005/0238368 | A1 | 10/2005 | Ikeuchi et al. | |
| 2006/0228117 | A1* | 10/2006 | Takeuchi et al. ............... | 398/183 |
| 2007/0166053 | A1* | 7/2007 | Kondo et al. .................. | 398/183 |
| 2007/0292143 | A1* | 12/2007 | Yu et al. ......................... | 398/188 |
| 2008/0181620 | A1 | 7/2008 | Sasaki | |
| 2008/0232815 | A1* | 9/2008 | Shioiri et al. .................. | 398/140 |

FOREIGN PATENT DOCUMENTS

| | | |
|---|---|---|
| EP | 1 939 679 | 7/2008 |
| JP | 2642499 | 5/1997 |
| JP | 2003-234703 | 8/2003 |
| JP | 2003-279912 | 10/2003 |
| JP | 2008-187223 | 8/2008 |
| JP | 2009-58910 | 3/2009 |

OTHER PUBLICATIONS

European Search Report dated Jul. 14, 2010 in Application No. 10158943.0.
Japanese Office Action issued Oct. 16, 2012 in corresponding Japanese Patent Application No. 2009-092087.

* cited by examiner

*Primary Examiner* — M. R. Sedighian
(74) *Attorney, Agent, or Firm* — Staas & Halsey LLP

(57) ABSTRACT

A driving apparatus supplies a drive signal to an optical modulator corresponding to a phase modulation format, and also, divides a part of an output light from the optical modulator; extracts some optical component of the divided light, which is distant from a carrier frequency by integral multiple of a modulation frequency, to detect a power of the optical component; and feedback controls a duty ratio of the drive signal or a cross-point level thereof so that the detected power approaches a minimum value. Thus, it is possible to stably perform phase modulation with high precision.

16 Claims, 19 Drawing Sheets

FIG.18

| | | H SIDE | +fo | +fo | | | | |
| --- | --- | --- | --- | --- | --- | --- | --- | --- |
| | | | +fo' | +fo' | | | | |
| Vdrv < 2Vπ | ΔVb < 0 | L SIDE | +fo | +2fo | +fo, +2fo +fo', +2fo' | | | |
| | | | +fo' | +2fo' | | | | |
| | | H SIDE | +fo | +fo | +fo | | | |
| | | | +fo' | +fo' | | | | |
| | ΔVb = 0 | L SIDE | +fo | -fo' | -fo | | | |
| | | | -fo' | -fo' | | | | |
| | | H SIDE | +fo | +2fo | +fo, +2fo +fo', +2fo' | | | |
| Vdrv = 2Vπ | | | +fo' | +2fo' | | | | |
| | ΔVb > 0 | L SIDE | +fo | +fo | -fo | | | |
| | | | +fo' | +fo' | | | | |
| | | | +2fo | +2fo' | +fo' | +2fo +2fo | OPTIMUM STATE +2fo +2fo' | -fo' |
| | | | | | -fo | +2fo +2fo | +2fo +2fo' | |
| | | | +2fo | +2fo' | -fo | +2fo | +2fo' | |
| | | | | | +fo' | +2fo | +2fo' | |
| Vdrv > 2Vπ | | | -fo, +2fo +fo', +2fo' | -fo | -fo, +2fo -fo', +2fo' | | | |
| | | | +2fo | +2fo' | -fo | -fo | +fo' | -fo -fo' +2fo' |
| | | | | | -fo | -fo | -fo | |

DRIVING METHOD AND DRIVING APPARATUS FOR OPTICAL MODULATOR, AND OPTICAL TRANSMITTER USING SAME

CROSS-REFERENCE TO RELATED APPLICATION

This application is based upon and claims the benefit of priority of the prior Japanese Patent Application No. 2009-092087, filed on Apr. 6, 2009, the entire contents of which are incorporated herein by reference.

FIELD

The embodiments discussed herein are related to a driving method and a driving apparatus for an optical modulator which corresponds to a phase modulation format to be utilized in an optical communication system, and an optical transmitter using the same.

BACKGROUND

In recent years, transmission speeds of signal lights in optical communication systems have been speeded up from 10 Gb/s (gigabits/second) to 40 Gb/s, for example. With this speed-up of optical transmission, a modulation format for signal light has been shifted from intensity modulation to phase modulation. In comparison with the intensity modulation, the phase modulation has merits such that: receiver amplitude becomes twice by applying differential receiver so that receiver sensitivity is improved by 3 dB; since signal light intensity is fixed, an influence of a noise accompanied with an intensity change is small so that tolerance to a nonlinear effect during fiber transmission is high; and the like.

In an optical transmitter corresponding to the phase modulation format of 40 Gb/s or the like, a circuit configuration applying a distributed constant type amplifier is typically used in order to realize a drive circuit which generates a drive signal of high-speed and large amplitude. In such a drive circuit, it is necessary to consider changes in duty ratio of the drive signal and output amplitude thereof, which occur due to variations of power source voltage, temperature and the like. Incidentally, the duty ratio of the drive signal may be treated as a cross-point level in an eye pattern waveform of the drive signal, and therefore, in this case, a change in the cross-point level needs to be considered.

As a conventional technology relating to a driving of an optical modulator and a control thereof, there has been known a technology which superposes a low frequency signal on a drive signal corresponding to input data, and based on a detection result of a low-frequency signal component contained in a signal light (modulation signal) output from the optical modulator, controls a direct current bias voltage for regulating an operation point of the optical modulator (refer to Japanese Patent No. 2642499).

Further, for an optical transmission circuit corresponding to a carrier suppressed return to zero (CS-RZ) modulation format or the like, there has been proposed a technology which measures an optical spectrum of an output light from an optical modulator and controls a bias voltage so that power density of a carrier spectrum component becomes minimum (refer to Japanese Laid-open Patent Publication No. 2003-234703). This control technology focuses on characteristics of the CS-RZ modulation format in that the carrier spectrum component is suppressed at an optimum bias point, but appears when a bias point is deviated, to thereby optimize the bias point of the optical modulator.

However, in the driving of the optical modulator and the control thereof according to the above conventional technology, there is a problem in that the changes in duty ratio (or cross-point level) of the drive signal and output amplitude thereof in the above described phase modulation format may not be controlled. Namely, in the conventional control, the direct current bias voltage for regulating the operation point of the optical modulator is to be controlled, but the duty ratio (cross-point level) of the drive signal and the output amplitude thereof which follow the input data at a high bit rate are not to be controlled. Further, change characteristics in the optical spectrum due to variations in the power source voltage, the temperature and the like in the intensity modulation format, such as the CS-RZ or the like, are different from those in the phase modulation format, and therefore, it is difficult to control the drive signal corresponding to the above variations in the phase modulation format only by monitoring the carrier spectrum component. Namely, for the case where the optical modulator corresponding to the phase modulation format is driven by the drive circuit which uses the distributed constant type amplifier, it is necessary to realize a control technology capable of optimizing not only the direct current bias voltage, but also the duty ratio (or cross-point level) and output amplitude of the drive signal which is changed at a high speed in accordance with the input data.

Incidentally, as described later in detail, it is possible to deal with the control of the output amplitude of the drive signal in the phase modulation format, by applying the conventional technology which superposes the low-frequency signal on the drive signal. However, it is difficult to optimize the duty ratio (or cross-point level) of the drive signal only by such an application, and accordingly, it is necessary to establish a new control method adaptable to the phase modulation format.

SUMMARY

The invention proposes, as one aspect thereof, a driving apparatus for driving an optical modulator corresponding to a phase modulation format. The driving apparatus includes: a driver configured to supply a drive signal having a frequency in accordance with input data to the optical modulator; an output light divider configured to divide a part of a phase modulated light output from the optical modulator; an optical extracting section configured to extract some optical component of the light divided in the output light divider, which is distant from a frequency of a carrier light input to the optical modulator by integral multiple of a frequency of the drive signal; a power detector configured to detect a power of the optical component extracted in the optical extracting section; and a controller configured to control the driver based on the power detected in the power detector. It is preferable to configure the controller of the driving apparatus to control the setting of a duty ratio or a cross-point level in the driver so that the power detected in the power detector approaches a minimum value.

The object and advantages of the invention will be realized and attained by means of the elements and combinations particularly pointed out in the claims.

It is to be understood that both the foregoing general description and the following detailed description are exemplary and explanatory only and are not restrictive of the invention, as claimed.

BRIEF DESCRIPTION OF THE DRAWINGS

FIG. 18 is a diagram compiling frequencies of low-frequency signal components in respective states of FIG. 15 to FIG. 17.

DESCRIPTION OF EMBODIMENTS

Hereinafter, embodiments of the invention will be described in detail with reference to drawings.

Figure 1:
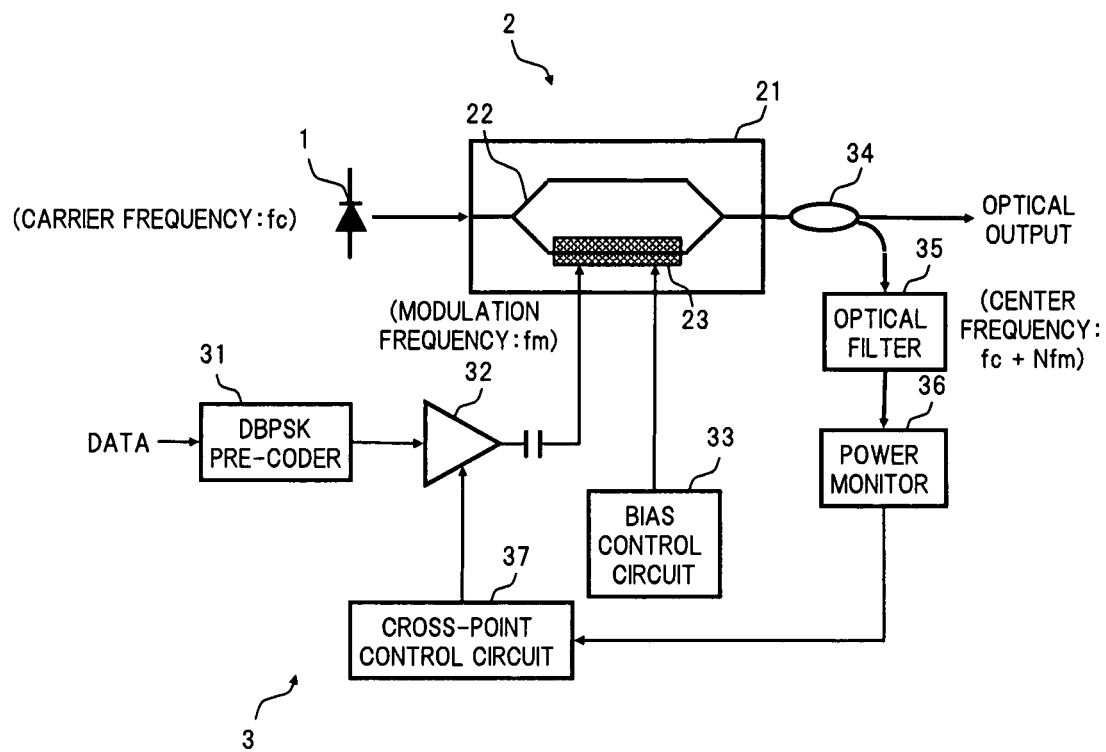
FIG. 1 is a block diagram illustrating a configuration of an optical transmitter according to a first embodiment.

FIG. 1 is a block diagram illustrating a configuration of an optical transmitter according to a first embodiment.

In FIG. 1, the optical transmitter in the present embodiment comprises, for example, a light source 1, an optical modulator 2 and a driving apparatus 3.

The light source 1 generates a carrier light (continuous light) to output it to the optical modulator 2. Herein, a frequency of the carrier light (to be called "a carrier frequency" hereunder) output from the light source 1 to the optical modulator 2 is noted as "fc". The light source 1 may be the one of which carrier frequency fc is fixed or may be the one of which carrier frequency is variable.

The optical modulator 2 comprises, for example: a crystal substrate 21 having an electro-optic effect, such as lithium niobate ($LiNbO_3$: LN); a Mach-Zehnder (MZ) optical waveguide 22 formed on the crystal substrate 21; and a signal electrode 23. The MZ optical waveguide 22 receives the carrier light from the light source 1 at one end of an input waveguide thereof, branches the carrier light at a Y-branch positioned on the other end of the input waveguide to send the branched carrier lights to a pair of branching arms, and multiplexes the lights propagated through the respective branching arms at an output side Y-branch to output the multiplexed light from an output waveguide thereof. The signal electrode 23 is disposed along one of the branching arms of the MZ optical waveguide 22, and is applied with a signal for driving the optical modulator, which is output from the driving apparatus 3. The output signal from the driving apparatus contains a drive signal at a high bit rate, such as, 40 Gb/s and a direct current bias voltage for regulating an operation point of the optical modulator 2.

The driving apparatus comprises, for example, a DBPSK pre-coder 31, a driver amplifier 32, a bias control circuit 33, an optical branching device 34, an optical filter 35, a power monitor 36 and a cross-point control circuit 37.

The DBPSK pre-coder 31 performs a logical operation on a current signal and a signal of 1 bit before, in accordance with input data DATA which is fed from the outside, and then, outputs a signal indicating the operation result to the driver amplifier 32.

The driver amplifier 32 generates a drive signal for driving the optical modulator 2, according to the output signal from the DBPSK pre-coder 31. This driver amplifier 32 includes a distributed constant type amplifier, and has a circuit configuration capable of generating a drive signal of high speed and large amplitude. Further, the driver amplifier 32 is provided with a cross-point control terminal, and therefore, is capable of regulating a cross-point level of the drive signal according to a control voltage applied to the cross-point terminal. Output amplitude of this drive signal is set at a voltage of $2V\pi$, which uses an interval of peak-trough-peak of periodic drive voltage-to-optical intensity characteristics of the optical modulator 2. Herein, in order to easily understand the explanation of cross-point level optimization, the output amplitude is fixed at $2V\pi$. Countermeasures to variations in the output amplitude will be described in detail in further embodiments described later.

When the drive signal output from the driver amplifier 32 is applied on the signal electrode 23 of the optical modulator 2 via a condenser which cuts off a direct component, a differential binary phase shift keying (DBPSK) signal light which expresses whether or not the current signal is changed relative to the signal of 1 bit before as whether or not an optical phase is changed, is generated in the optical modulator 2. Incidentally, a frequency (modulation frequency) of the drive signal output from the driver amplifier 32 is noted as fm.

The bias control circuit 33 generates a required bias voltage to apply it on the signal electrode 23 of the optical modulator 2. This bias voltage regulates the operation point of the optical modulator 2, so that a center voltage of the drive signal which is changed in the amplitude of $2V\pi$ is coincident with a trough portion of the drive voltage-to-optical intensity characteristics of the optical modulator 2. Although a specific configuration of the bias control circuit 33 is omitted in the figure, it is preferable that the bias control circuit 33 is provided with a function of optimizing the bias voltage by using the above described known control technology, so that operation point drift due to temperature variations or the like is compensated.

The optical branching device 34 branches a part of the DBPSK signal light output from the optical modulator 2 as a monitor light, to output the monitor light to the optical filter 35. A branching ratio in the optical branching device 34 can be appropriately set according to detection sensitivity of an optical power in the power monitor 36 described below.

The optical filter 35 has a transmission band in which some spectrum component contained in the monitor light from the optical branching device 34, which is distant from the carrier frequency fc by integer multiple of the modulation frequency fm, can be extracted. It is preferable to design the optical filter 35 so that a center frequency of the transmission band becomes fc+Nfm (N is one of integers excluding 0). For example, in the case of N=1, the spectrum component which is distant to a high frequency side from the carrier frequency fc by the modulation frequency fm, is extracted, whereas in the case of N=−1, the spectrum component which is distant to a low frequency side from the carrier frequency fc by the modulation frequency fm, is extracted. It is desirable to design the transmission bandwidth of the optical filter 35, taking a variation amount of an output frequency of the light source 1 into consideration.

The power monitor 36 converts the transmitted light from the optical filter 35 into an electric signal using a light receiving element or the like, and detects a power of the transmitted light from the optical filter 35 using the electric signal, to transmit the detection result to the cross-point control circuit 37.

The cross-point control circuit 37 optimizes the cross-point level of the drive signal output from the driver amplifier 32, based on the power detected in the power monitor 36 of the spectrum component of the frequency fc+Nfm. The cross-point level is a signal level at which the rising and the falling in an eye pattern waveform of the drive signal crosses with each other. The optimization of the cross-point level is realized by performing a feedback control on the control voltage which is to be applied on the cross-point control terminal provided in the driver amplifier 32 so that the monitor value in the power monitor 36 approaches a minimum value, in accordance with a principle to be explained in the followings. Incidentally, if the cross-point level is dealt with as a duty ratio, the optimization of the cross-point level may be replaced with the optimization of the duty ratio.

Figure 2:
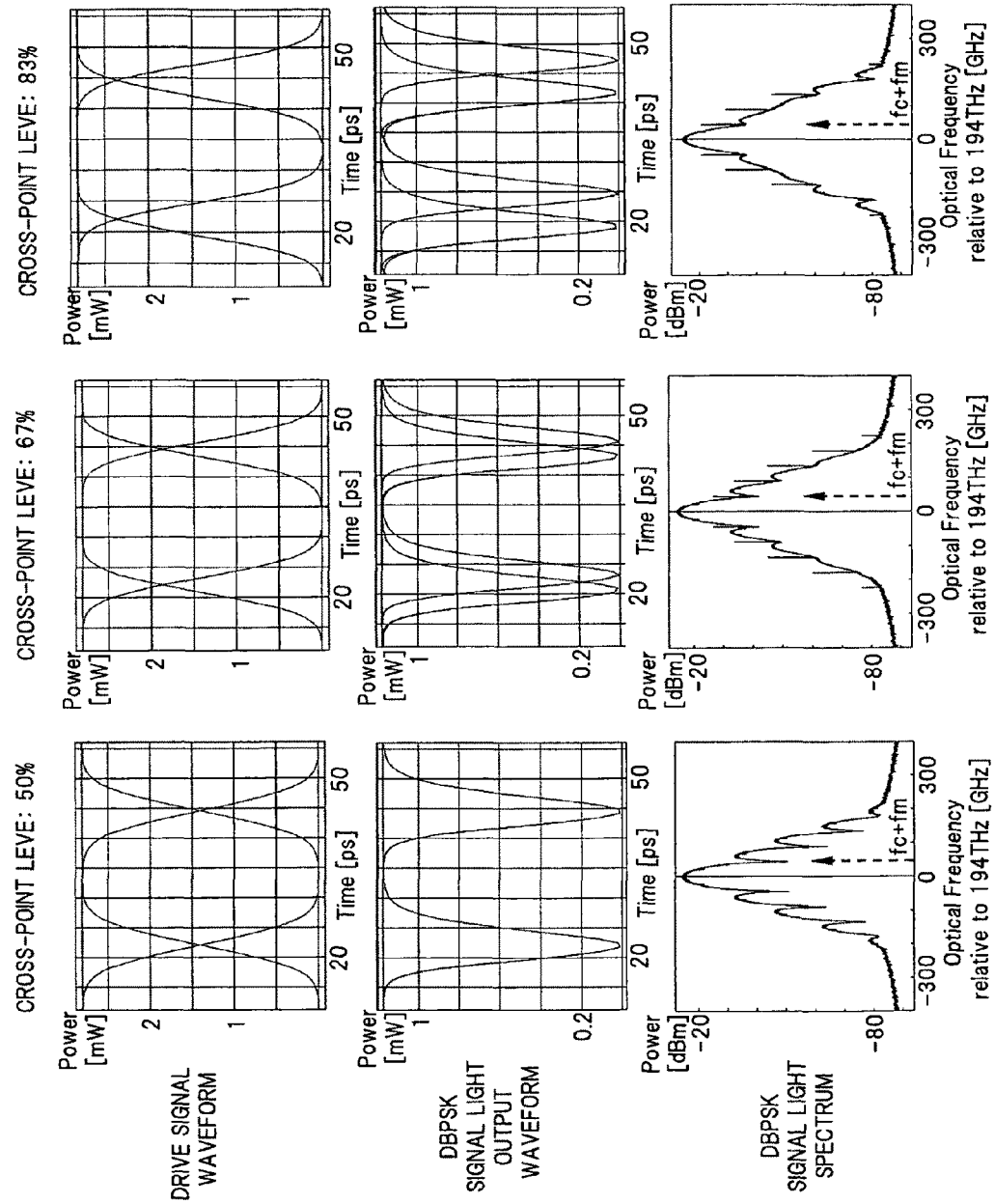
FIG. 2 is a diagram for explaining a principle of optimization of cross-point level in the first embodiment.

FIG. 2 is a diagram for explaining a principle of optimization of the above cross-point level. An upper stage of FIG. 2 exemplarily illustrates waveforms of the drive signals applied on the signal electrode 23 of the optical modulator 2, according to the cross-point levels. Further, a medium stage and a lower stage of FIG. 2 illustrate respectively output waveforms and optical spectrums, which correspond to the drive signals in the upper stage, of the DBPSK signal lights output from the optical modulator. Incidentally, in each optical spectrum in the lower stage, a frequency on a horizontal axis is set with the carrier frequency fc as a standard (center). The cross-point levels are expressed using ratios (%) relative to the amplitudes of the drive signals. 50% (left side of FIG. 2) indicates a state where the cross-point is positioned on just the center between a low level of the drive signal and a high level thereof, and 67% (center of FIG. 2) and 83% (right side of FIG. 2) indicate a state where the cross-point is deviated to a high level side.

It is understood from FIG. 2 that in the case where the cross-point level of the drive signal is in an optimum state of 50%, in the spectrum of the DBPSK signal light, a peak does not appear at a position distant from the carrier frequency fc by integral multiple of the modulation frequency fm. This is because optical components corresponding to phases 0 and π of the DBPSK signal light are cancelled with each other in the optimum state where the cross-point level is 50%. On the other hand, it is understood that, in the case where the cross-point level of the drive signal is deviated from the optimum state, a peak appears at the position distant from the carrier frequency fc by integral multiple of the modulation frequency fm, and a peak power is increased with an increase of a deviation amount from the optimum state. This is because a balance between the optical components corresponding to the phases 0 and π of the DBPSK signal light is lost. Incidentally, differently from an intensity modulation format, in a phase modulation format, a power of spectrum component of the carrier frequency fc of phase modulated light is not changed.

Accordingly, some spectrum component of the DBPSK signal light output from the optical modulator 2, which is distant from the carrier frequency fc by integral multiple of the modulation frequency fm, is extracted and a power thereof is monitored, and then, a setting voltage for the cross-point level in the driver amplifier 32 is feedback controlled so that the monitor value approaches the minimum value, and consequently, the cross-point level of the drive signal for driving the optical modulator 2 can be optimized.

Figure 3:
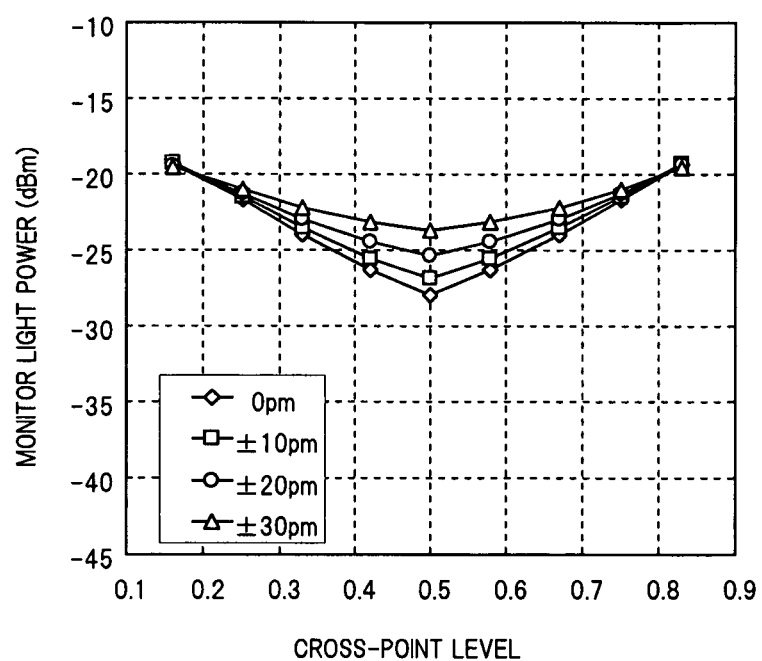
FIG. 3 is a graph illustrating a relation between a monitor light and the cross-point level in the first embodiment.

FIG. 3 is a diagram illustrating a simulation result of a relation between a power of the spectrum component of the frequency fc+Nfm in the output light from the optical modulator 2 and the cross-point level of the drive signal. In this simulation, for the transmission band of the optical filter 35, conditions of primary Gaussian form and 3 dB bandwidth=10 GHz are set, and a range of 0 to ±30 pm is assumed as wavelength variations in the carrier light output from the light source 1. Such conditions for the optical filter 35 and the light source 1 correspond to specifications available as standard parts.

As is apparent from FIG. 3, it is understood that, if the variations are around those in output wavelength (frequency) in the standard light source 1, the transmission bandwidth of the existing optical filter 35 is appropriately set, so that the cross-point level of the drive signal can be held in the optimum state by the feedback control of the driver amplifier 32 in accordance with the above described principle.

In the optical transmitter applied with the driving apparatus 3 as described above, the carrier light output from the light source 1 is input via one end of the MZ optical waveguide 22 of the optical modulator 2. In the optical modulator 2, the drive signal and the bias voltage output from the driving apparatus 3 are applied on the signal electrode 23, and a refractive index of the MZ optical waveguide 22 is changed due to an electro-optic effect caused by an electric field of the signal from the driving apparatus 3, so that the carrier light propagated through the MZ optical waveguide 22 is modulated in accordance with a DBPSK modulation format.

A part of the DBPSK signal light output from the optical modulator 2 is branched by the optical branching device 34 to be fed to the optical filter 35 as the monitor light. In the optical filter 35, some spectrum component of the monitor light, which is distant from the carrier frequency fc by integral multiple of the modulation frequency fm, is extracted to be output to the power monitor 36. In the power monitor 36, the power of the transmitted light from the optical filter 35 is detected and the electric signal indicating the detection result is transmitted to the cross-point control circuit 37.

In the cross-point control circuit 37, in accordance with the above described principle, the cross-point control voltage in the driver amplifier 32 is feedback controlled so that the power of the spectrum component of the frequency fc+Nfm detected in the power monitor 36 approaches the minimum value. As a result, even if the power source voltage, the temperature and the like are varied, the cross-point level of the drive signal supplied from the driver amplifier 32 to the optical modulator 2 is held in the optimum state of 50%. Thus, it becomes possible to perform stably phase modulation of the carrier light in the optical modulator 2.

Figure 4:
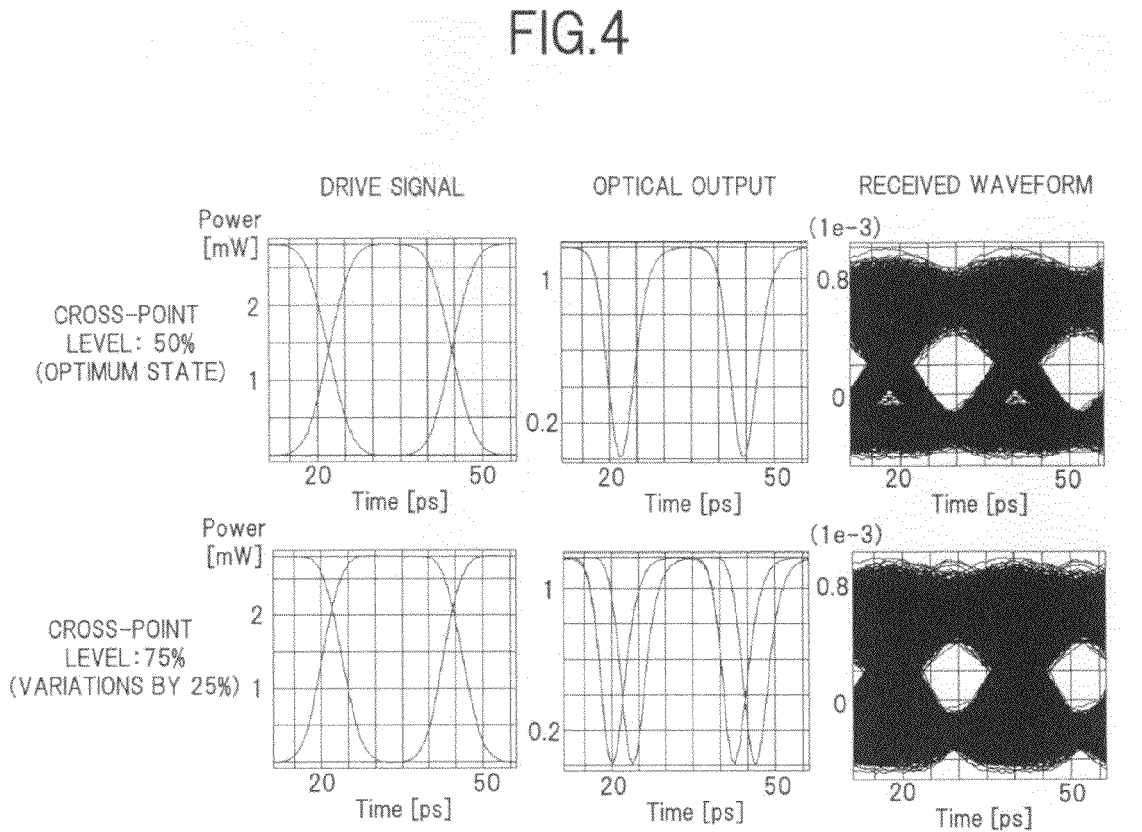
FIG. 4 is a diagram illustrating a simulation result of transmission characteristics of a DBPSK signal light in the first embodiment.
Figure 5:
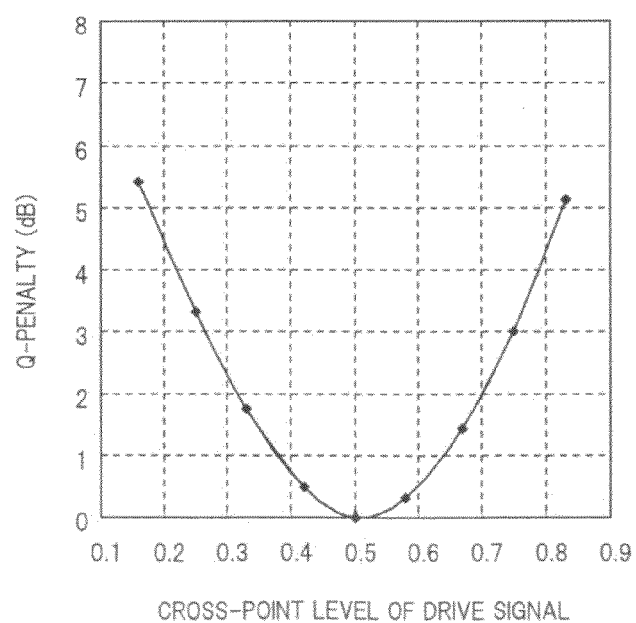
FIG. 5 is a graph illustrating a relation between the cross-point level and Q-penalty in FIG. 4.

FIG. 4 and FIG. 5 illustrate one example of simulation result of transmission characteristics of the DBPSK signal light output from the optical transmitter. An upper stage of FIG. 4 illustrates the drive signal waveform of the optical modulator 2 and the optical output waveform (transmission waveform of the DBPSK signal light) thereof, and the received waveform of the DBPSK signal light, for when the cross-point level of the drive signal is held in the optimum state of 50%. Contrary to this, a lower stage of FIG. 4 illustrates those waveforms for when the cross-point level of the drive signal is 75%, that is, the cross-point level of the drive signal is deviated from the optimum state by 25%. Further, FIG. 5 illustrates a relation of Q-penalty at a receiver end relative to the cross-point level of the drive signal.

It is understood from the simulation result of FIG. 4 and FIG. 5 that degradation of the received waveform of the DBPSK signal light can be effectively suppressed by controlling the cross-point level of the drive signal to be in the optimum state. In this example, by compensating the variations of 25% in the cross-point level, the transmission characteristics can be improved by about 3 dB in Q-penalty. Namely, it becomes possible to improve the transmission characteristics of the DBPSK signal light by configuring the optical transmitter having excellent tolerance to the variations in the cross-point level of the drive signal.

Next, there will be described a second embodiment of the optical transmitter.

In the first embodiment, there has been described one example of the optical transmitter corresponding to the DBPSK modulation format. However, for an optical transmitter corresponding to a further phase modulation format, it is also possible to optimize a cross-point level of a drive signal in accordance with a principle similar to that for the DBPSK. Therefore, in the second embodiment, there will be described an optical transmitter corresponding to a differential quadrature phase shift keying (DQPSK) format, for example.

Figure 6:
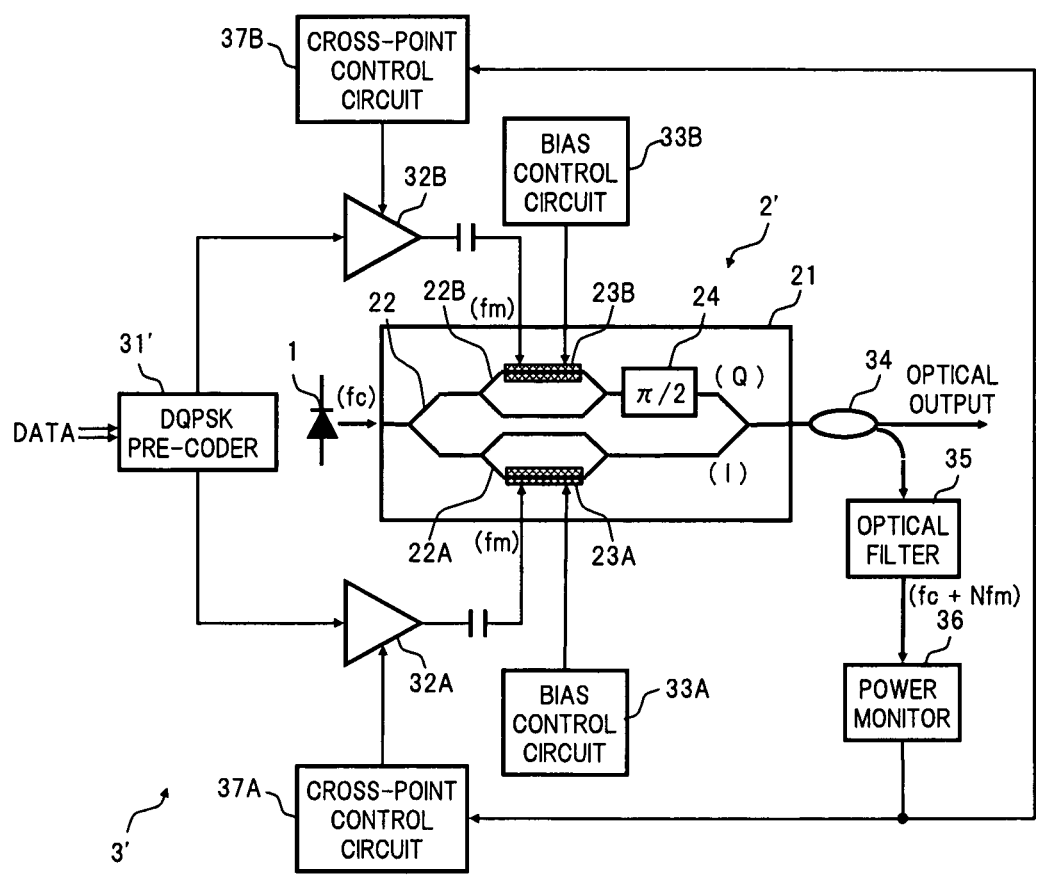
FIG. 6 is a block diagram illustrating a configuration of an optical transmitter according to a second embodiment.

FIG. 6 is a block diagram illustrating a configuration of the optical transmitter in the second embodiment.

In FIG. 6, the optical transmitter in the present embodiment comprises a light source 1 similar to that in the first embodiment, an optical modulator 2' and a driving apparatus 3' each corresponding to the DQPSK modulation format.

The optical modulator 2' comprises: a substrate 21 having an electro-optic effect, such as LN or the like; MZ optical waveguides 22, 22A and 22B, which are formed on the substrate 21; and signal electrodes 23A and 23B, which are formed on the substrate 21. In the MZ optical waveguide 22, on a pair of branching arms thereof, two MZ optical waveguides 22A and 22B are disposed. Herein, the MZ optical waveguide 22 is called "parent Mach-Zehnder waveguide", and the MZ optical waveguides 22A and 22B are called "child Mach-Zehnder waveguides".

The parent Mach-Zehnder waveguide 22 branches the carrier light from the light source 1 into two, to feed the branched lights to the child Mach-Zehnder waveguides 22A and 22B. On the child Mach-Zehnder waveguide 22A, along one of branching arms thereof, the signal electrode 23A is arranged, and on the child Mach-Zehnder waveguide 22B, along one of branching arms thereof, the signal electrode 23B is arranged. The output signal (the drive signal and the bias voltage) from the driving apparatus 3 is applied on each of the signal electrodes 23A and 23B, and a refractive index of each branching arm is changed due to an electric filed caused by the signal from the driving apparatus 3 so that guided lights of the child Mach-Zehnder waveguides 22A and 22B are phase modulated.

The phase modulated light output from one (herein, the child Mach-Zehnder waveguide 22B) of the two child Mach-Zehnder waveguides 22A and 22B is fed to a phase shifting section 24. The phase shifting section 24 shifts a phase of the output light from the child Mach-Zehnder waveguide 22B by π/2. The phase modulated light (Q-component) output from the phase shifting section 24 is multiplexed with the phase modulated light (I-component) output from the other child Mach-Zehnder waveguide 22A by the parent Mach-Zehnder waveguide 22. As a result, a DQPSK signal light of which phase is quadrature-changed in π/4, 3π/4, 5π/4 and 7π/4, is generated.

The driving apparatus 3' comprises, for example: a DQPSK pre-coder 31'; driver amplifiers 32A and 32B; bias control circuits 33A and 33B; an optical branching device 34; an optical filter 35; a power monitor 36; and cross-point control circuits 37A and 37B.

The DQPSK pre-coder 31' performs logical operations on a current signal and a signal of 1 bit before, in accordance with different input data DATA which are fed from the outside, and then, outputs signals indicating the operation results to the driver amplifiers 32A and 32B. A bit rate of the DQPSK signal light output from the optical modulator 2' is twice a bit rate of each signal output from the DQPSK pre-coder 31'. Therefore, in order to transmit the DQPSK signal light of 40 Gb/s for example, the signal of 20 Gb/s is output from the DQPSK pre-coder 31' to each of the driver amplifiers 32A and 32B.

The driver amplifiers 32A and 32B generate drive signals for driving the child Mach-Zehnder waveguides 22A and 22B, according to the output signals from the DQPSK pre-coder 31'. The driver amplifiers 32A and 32B each has a circuit configuration similar to that of the driver amplifier 32 used in the first embodiment. The drive signals generated in the driver amplifiers 32A and 32B are applied on the signal electrodes 23A and 23B of the optical modulator 2' via capacitors each of which cuts off a direct component. Incidentally, a frequency of the drive signal output from each of the driver amplifiers 32A and 32B is noted as fm. In this case, a modulation frequency in the entire optical modulator 2' is 2fm.

The bias control circuit 33A and 33B generate required bias voltages to apply them on the signal electrodes 23A and 23B of the optical modulator 2'. A configuration of each of the bias control circuits 33A and 33B is similar to the bias control circuit 33 used in the first embodiment.

The optical branching device 34 branches a part of the DQPSK signal light output from the optical modulator 2' as a monitor light, to output the monitor light to the optical filter 35. Similarly to the first embodiment, a branching ratio in the optical branching device 34 can be appropriately set according to detection sensitivity of the optical power in the power monitor 36.

The optical filter 35 is designed so that a center frequency of the transmission band becomes fc+Nfm (N is one of integers excluding 0), similarly to the first embodiment.

The power monitor 36 which is configured similarly to that in the first embodiment, transmits a detection result of a power of transmitted light of the optical filter 35 to the cross-point control circuits 37A and 37B.

Each of the cross-point control circuits 37A and 37B feedback controls a control voltage to be applied on each cross-point terminal provided in each of the driver amplifiers 32A and 32B so that the monitor value in the power monitor 36 approaches a minimum value, to make the cross-point level of the drive signal corresponding thereto to be in an optimum state of 50%.

Figure 7:
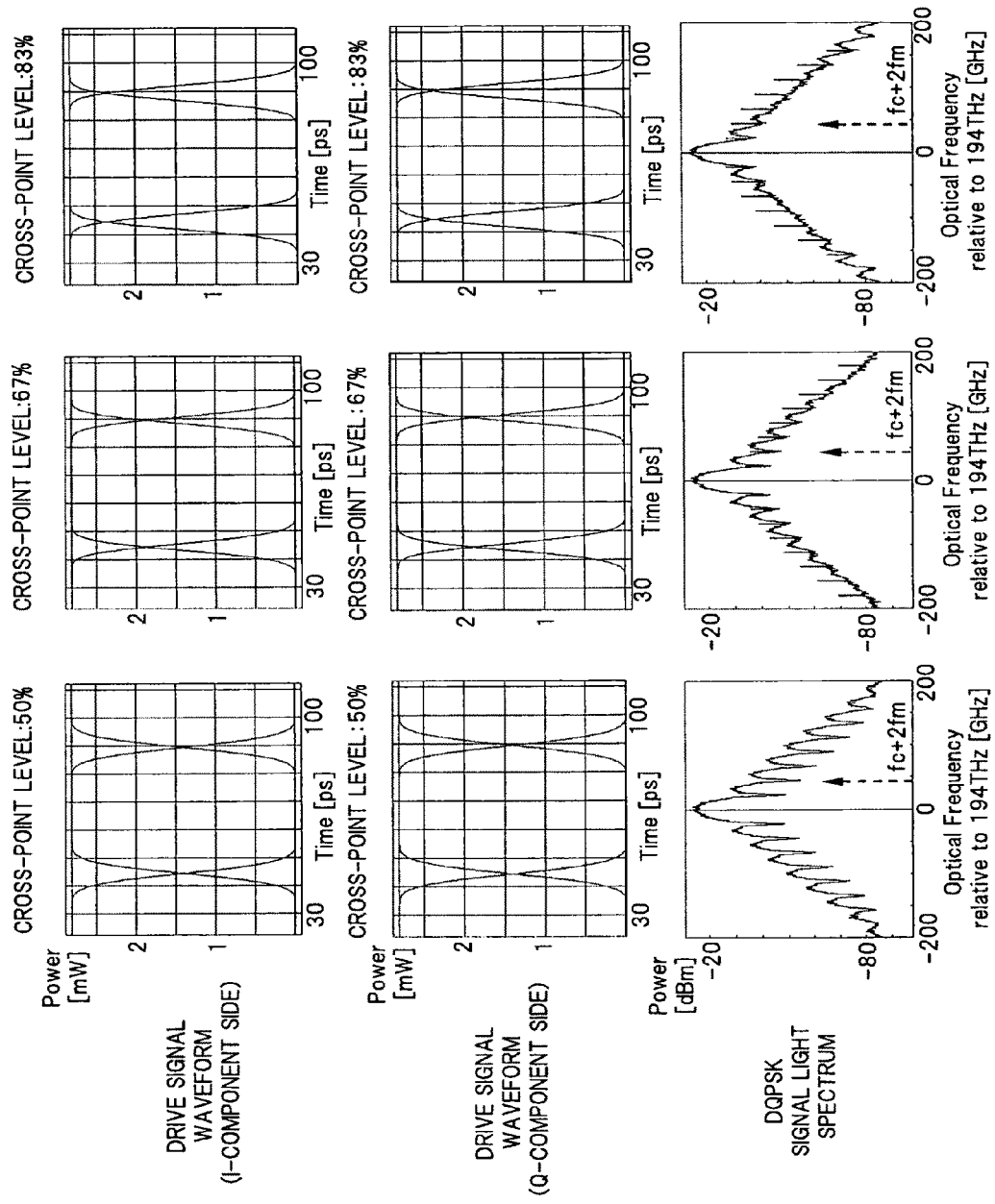
FIG. 7 is a diagram for explaining the optimization of cross-point level in the second embodiment.
Figure 8:
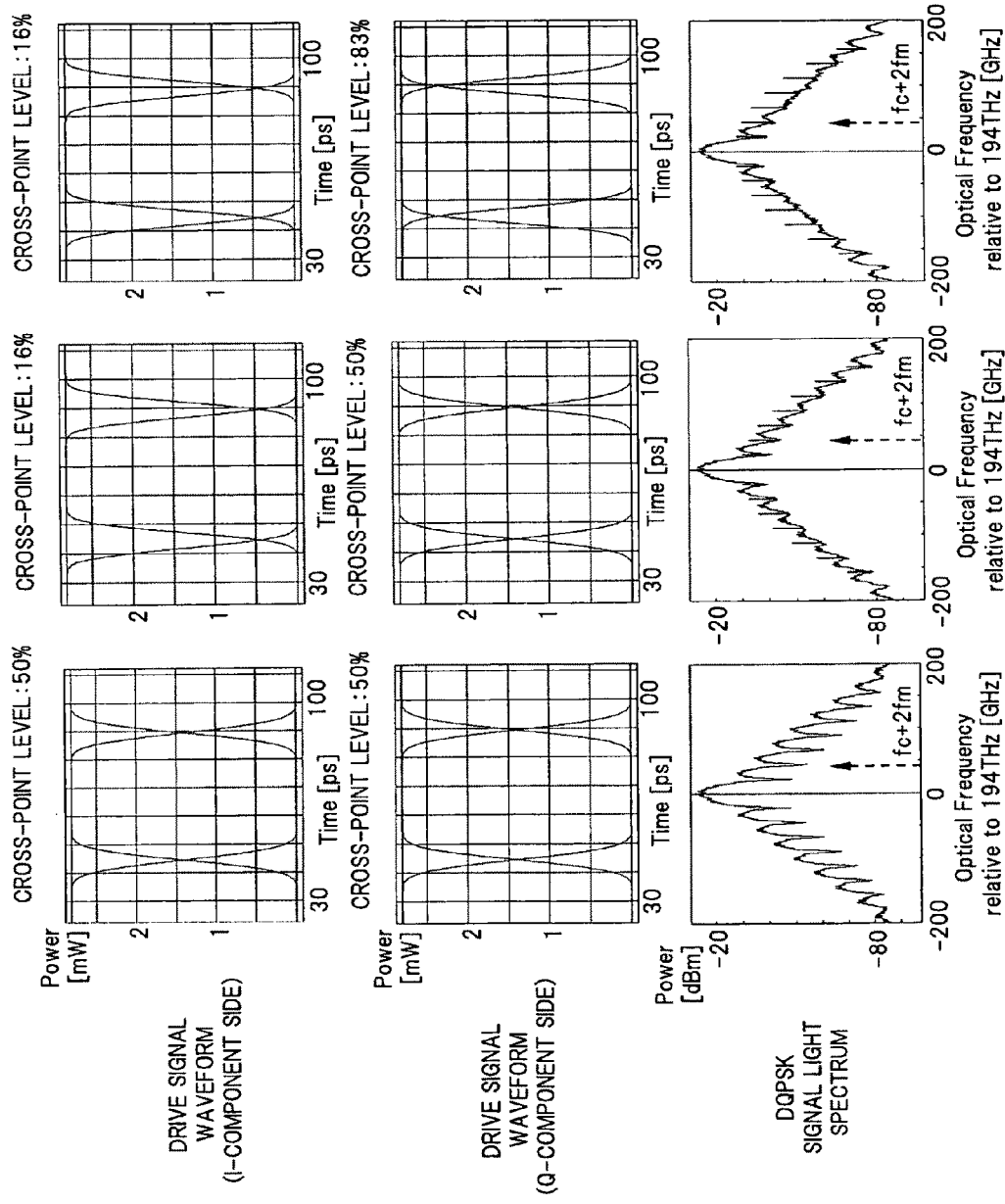
FIG. 8 is a further diagram for explaining the optimization of cross-point level in the second embodiment.

FIG. 7 and FIG. 8 are diagrams for explaining optimization of cross-point level in the DQPSK modulation format. FIG. 7 illustrates the case where the cross-point level of the drive signal on the I-component side which is output from the driver amplifier 32A and the cross-point level of the drive signal on the Q-component side which is output from the driver amplifier 32B are varied at the same ratio. On the other hand, FIG. 8 illustrates the case where the cross-point levels of the drive signals on the I-component and Q-component sides are varied at different ratios.

It is understood from FIG. 7 and FIG. 8 that in the case where the cross-point levels of the drive signals on the I-component and Q-component sides are in optimum states of 50%, in a spectrum of the DQPSK signal light, a peak does not appear in a frequency distant from the carrier frequency fc by integral multiple of the modulation frequency fm. On the other hand, it is understood that, in the case where one of or either of the cross-point levels of the drive signals on the I-component and Q-component sides is deviated from the optimum state, a peak power of spectrum component of the frequency which is distant from the carrier frequency fc by integral multiple of the modulation frequency fm, is increased with an increase of deviation amount from the optimum state. Namely, also in the DQPSK modulation format, the cross-point levels of the drive signals on the I-component and Q-component sides can be optimized, in accordance with a principle similar to that in the first embodiment.

The frequency of the spectrum component extracted by the optical filter 32 from the output light of the optical modulator 2' may be set at a frequency fc+2fm (or fc−2fm) so as to correspond to the fact that the frequency of the DQPSK signal light output from the optical modulator 2' is twice the frequency fm of each drive signal. However, the frequency of the spectrum component extracted by the optical filter 35 is not limited to the above, and may be any of the frequencies distant from the carrier frequency fc by integral multiple of the modulation frequency fm.

Then, the transmitted light power from the optical filter 35 is detected in the power monitor 36, and the cross-point control circuits 37A and 37B each feedback controls a cross-point setting voltage of each of the driver amplifiers 32A and 32B so that the monitor value approaches the minimum value. As a result, the cross-point levels of the drive signals on the I-component and Q-component sides for driving the optical modulator 2', can be held in the optimum states of 50%.

Next, there will be described a third embodiment of the optical transmitter. Herein, there will be described the optical transmitter corresponding to a RZ-DBPSK modulation format.

Figure 9:
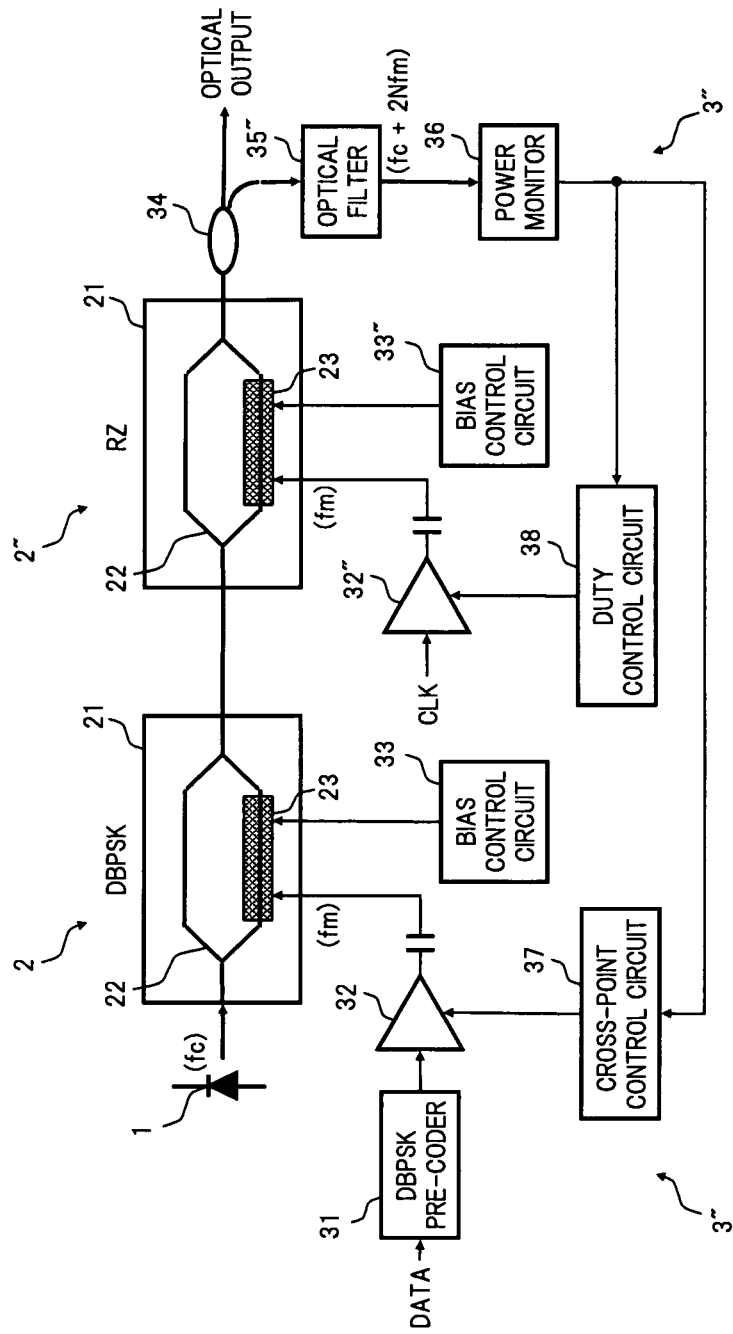
FIG. 9 is a block diagram illustrating a configuration of an optical transmitter according to a third embodiment.

FIG. 9 is a block diagram illustrating a configuration of the optical transmitter in the third embodiment.

In FIG. 9, the optical transmitter in the present embodiment comprises: a light source 1 and an optical modulator 2 which are similar to those in the first embodiment; an optical modulator 2" which performs RZ-pulsation on a DBPSK signal light output from the optical modulator 2; and a driving apparatus 3" which drives the optical modulators 2 and 2".

The optical modulator 2" has a configuration basically same as that of the former staged optical modulator 2, and comprises: a crystal substrate 21 having an electro-optic effect, such as LN or the like; and a MZ optical waveguide 22 and a signal electrode 23, which are formed on the crystal substrate 21. This optical modulator 2" is driven in accordance with a clock signal CLK synchronized with the input data DATA, and intensity modulates an input light (DBPSK signal light) to perform the RZ-pulsation thereon.

The driving apparatus 3" comprises: a DBPSK pre-coder 31; driver amplifiers 32 and 32"; bias control circuits 33 and 33"; an optical branching device 34; an optical filter 35"; a power monitor 36; a cross-point control circuit 37; and a duty control circuit 38. Incidentally, the DBPSK pre-coder 31, the driver amplifier 32, the bias control circuit 33, the optical branching device 34, the power monitor 36 and the cross-point control circuit 37 are similar to those in the first embodiment, and therefore, the description thereof is omitted here.

The driver amplifier 32" receives the clock signal CLK of frequency fm synchronized with the input data DATA, to generate a drive signal for driving the optical modulator 2" in accordance with the clock signal CLK. This driver amplifier 32" is provided with a duty control terminal, and therefore, it is possible to regulate a duty ratio of the drive signal according to a control voltage applied on the duty control terminal. Output amplitude of this drive signal is set at a voltage of $V\pi$, which uses an interval of peak-trough of periodic drive voltage-to-optical intensity characteristics of the optical modulator 2". A frequency of the drive signal is fm same as the clock frequency.

The bias control circuit 33" generates a required bias voltage to apply it on the signal electrode 23 of the optical modulator 2". This bias voltage regulates the operation point of the optical modulator 2, so that a center voltage of the drive signal which is changed in the amplitude of $V\pi$ is coincident with an intermediate of peak-trough of the drive voltage-to-optical intensity characteristics of the optical modulator 2". Although a specific configuration of the bias control circuit 33" is omitted in the figure, it is preferable that the bias control circuit 33" is provided with a function of optimizing the bias voltage by using the above described known control technology, so that operation point drift due to temperature variations or the like is compensated.

The optical filter 35" has a transmission band in which some spectrum component distant from the carrier frequency fc by integer multiple of the modulation frequency fm, which is contained in the monitor light from the optical branching device 34, can be extracted. It is preferable to design the optical filter 35" so that a center frequency of the transmission band becomes fc+2Nfm (N is one of integers excluding 0). It is preferable to design the transmission bandwidth of the optical filter 35", taking a variation amount of output frequency of the light source 1 into consideration, similarly to the first embodiment.

The duty control circuit 38 optimizes the duty ratio of the drive signal output from the driver amplifier 32", based on a power of spectrum component of frequency fc+2Nfm, which is detected in the power monitor 36. This optimization of duty ratio is realized by feedback controlling the control voltage which is to be applied on the duty control terminal provided in the driver amplifier 32", so that the monitor value in the power monitor 36 approaches a minimum value.

Figure 10:
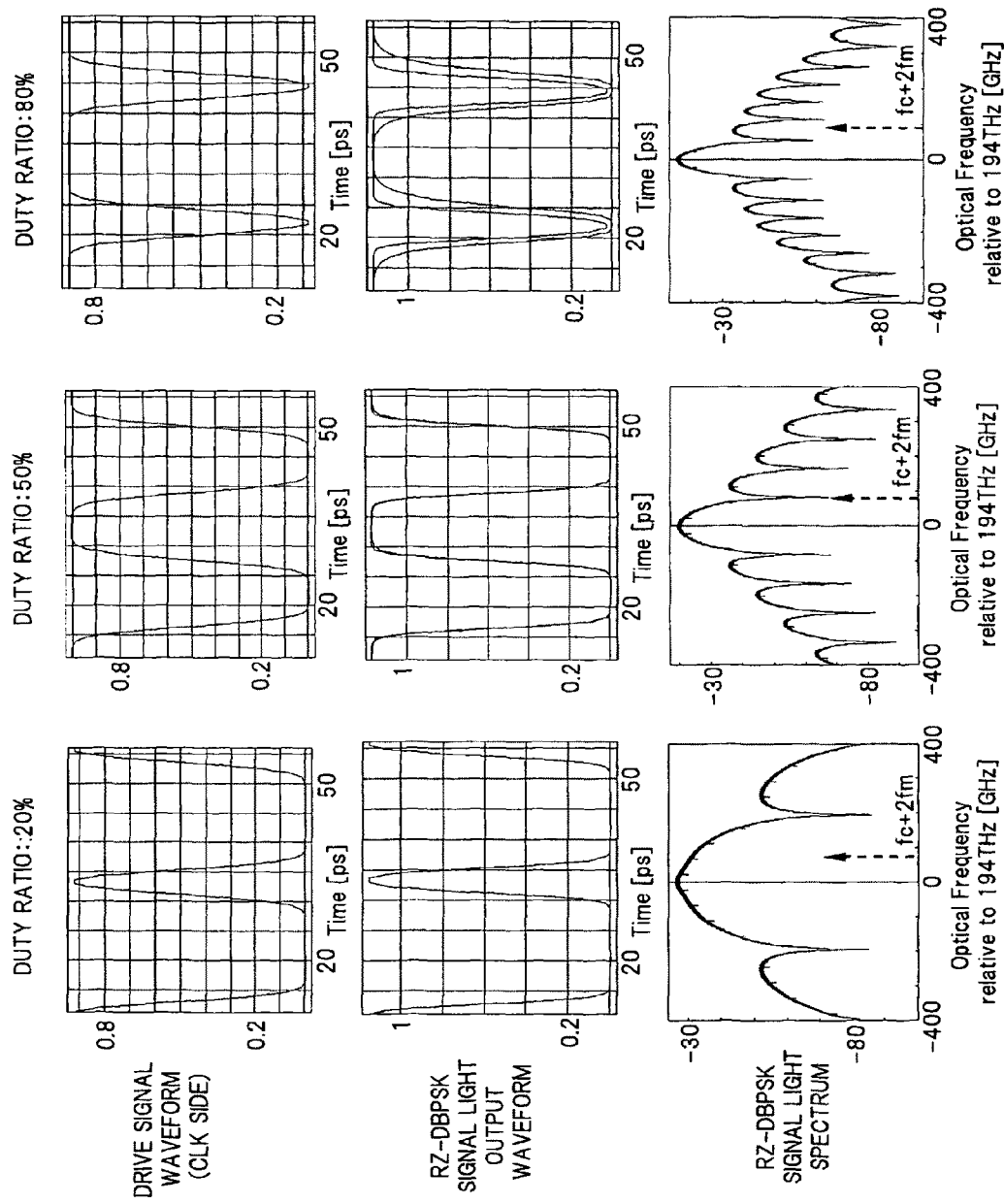
FIG. 10 is a diagram for explaining the optimization of duty ratio in the third embodiment

FIG. 10 is a diagram for explaining the optimization of duty ratio of the drive signal for the optical modulator 2" side in the RZ-DBPSK modulation format. An upper stage of FIG. 10 exemplarily illustrates waveforms of the drive signals for the optical modulator 2" side according to the duty ratio. Further, a medium stage and a lower stage of FIG. 10 illustrate respectively output waveforms of the RZ-DBPSK signal light output from the optical modulator 2" and optical spectrums thereof, which correspond to the drive signals in the upper stage. The duty ratio is noted using a ratio (%) occupied by a high level side in one cycle of the drive signal. 50% indicated on the center of FIG. 10 represents an optimum state, and 20% and 80% indicated on the left and right sides represent states where the duty ratio is deviated.

It is understood from FIG. 10 that in the case where the duty ratio of the drive signal for the optical modulator 2" side is in the optimum state of 50%, in the spectrum of the RZ-DBPSK signal light, a trough appears at a position distant from the carrier frequency fc by integral multiple of the modulation frequency fm. On the other hand, it is understood that, in the case where the duty ratio of the drive signal is deviated from the optimum state, a power at the position distant from the carrier frequency fc by integral multiple of the modulation frequency fm, is increased. Accordingly, some spectrum component of the RZ-DBPSK signal light output from the optical modulator 2", which is distant from the carrier frequency fc by integral multiple of the modulation frequency fm, is extracted and a power thereof is monitored, and then, the setting voltage for the duty ratio in the driver amplifier 32" is feedback controlled so that the monitor value approaches the minimum value, and consequently, the duty ratio of the drive signal for driving the optical modulator 2" can be optimized.

Figure 11:
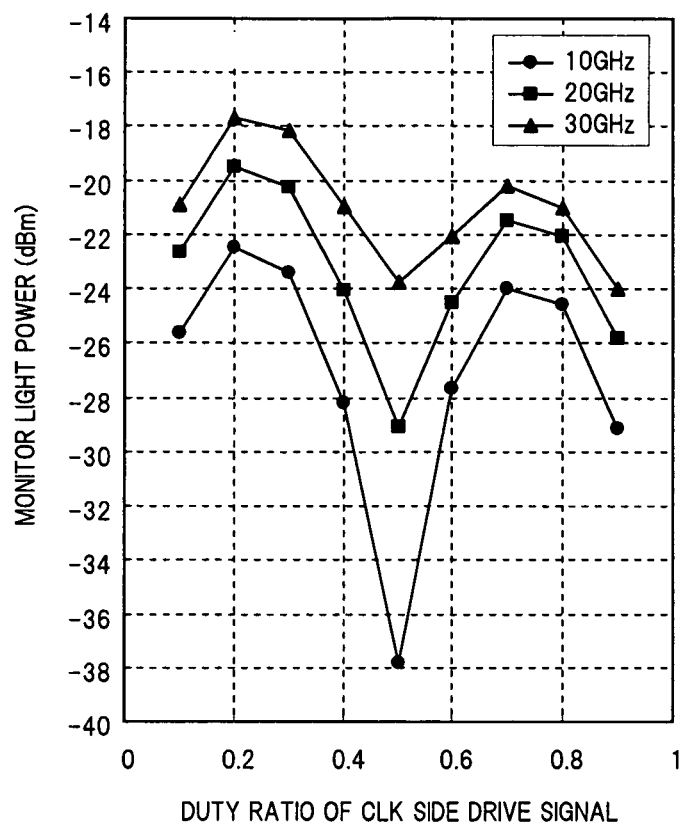
FIG. 11 is a graph illustrating a relation between a monitor light power and the duty ratio in the third embodiment.

FIG. 11 is a diagram illustrating a simulation result of a relation between a power of the spectrum component of the frequency fc+2Nfm in the RZ-DBPSK signal light and the duty ratio of the drive signal for the optical modulator 2". In this simulation, for the transmission band of the optical filter 35", conditions of primary Gaussian form and 3 dB bandwidth=10 GHz to 30 GHz are set. It is understood from FIG. 11 that, if the transmission bandwidth of the optical filter 35" is appropriately set, the duty ratio of the drive signal can be held in the optimum state by feedback controlling the above driver amplifier 32".

Incidentally, for the driving and controlling of the former staged optical modulator 2 which generates the DBPSK signal light, the monitor value in the power monitor 36 is transmitted not only to the duty control circuit 38 but also to the cross-point control circuit 37, and similarly to the first embodiment, the setting voltage for the cross-point level in the driver amplifier 32 is feedback controlled so that the monitor value approaches the minimum value. It is preferable to perform switching control on the feedback control of the driver amplifier 32 by the cross-point control circuit 37 and the feedback control of the driver amplifier 32" by the duty control circuit 38 in accordance with a required control sequence.

Figure 12:
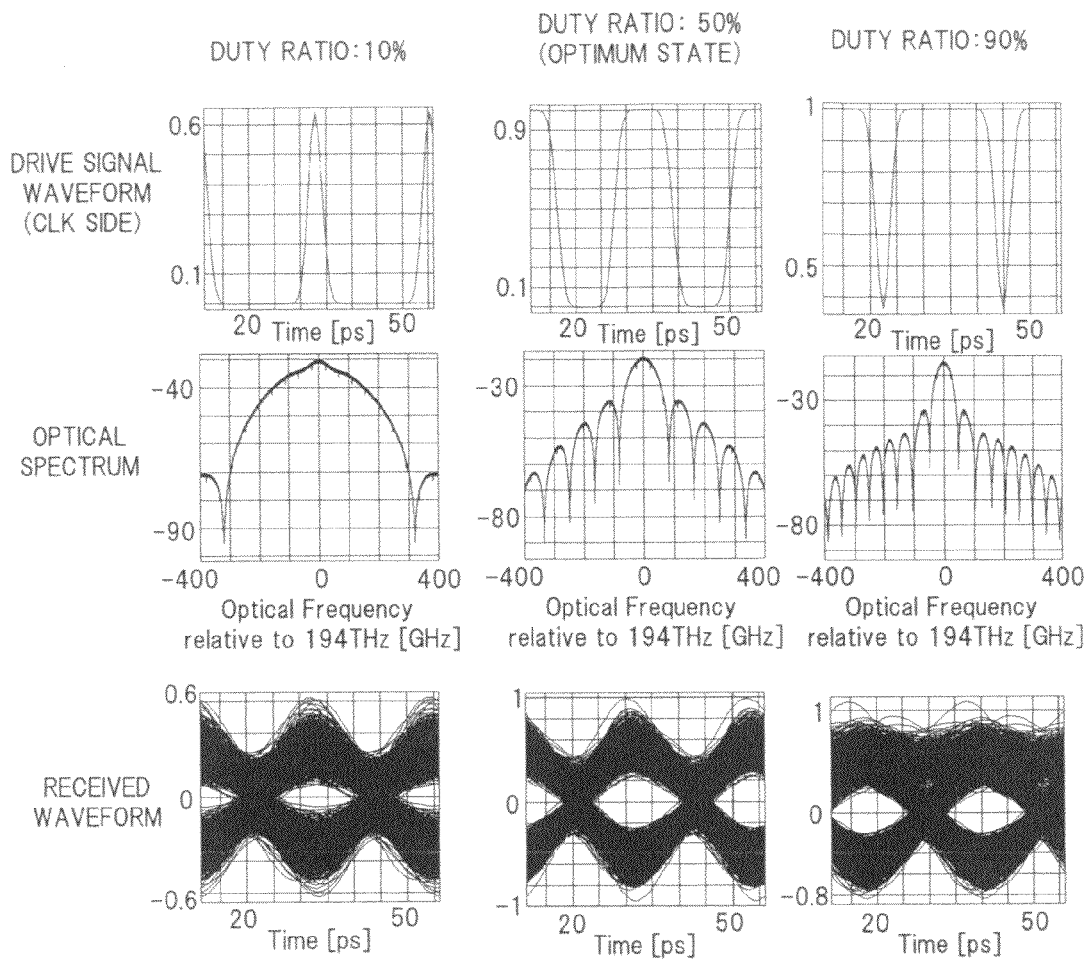
FIG. 12 is a diagram illustrating a simulation result of transmission characteristics of a RZ-DBPSK signal light in the third embodiment.
Figure 13:
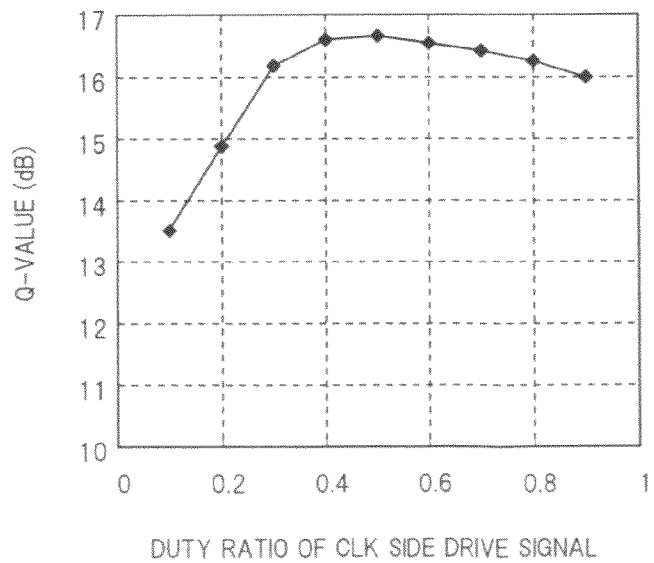
FIG. 13 is a graph illustrating a relation between the duty ratio and a Q-value in FIG. 12.

FIG. 12 and FIG. 13 illustrate one example of simulation result of transmission characteristics of RZ-DBPSK signal light output from the optical transmitter in the present embodiment. An upper stage of FIG. 12 illustrates waveforms of the drive signals for the optical modulator 2" according to the duty ratio. A medium stage of FIG. 12 illustrates the spectrums of the RZ-DBPSK signal lights output from the optical transmitter so as to correspond to the drive signals in the upper stage. A lower stage of FIG. 12 illustrates received waveforms corresponding to the RZ-DBPSK signal lights in the medium stage. Further, FIG. 13 illustrates a relation of Q-value on the receiver end relative to the duty ratio of the drive signal for the optical modulator 2".

It is understood from FIG. 12 and FIG. 13 that, by controlling the duty ratio of the drive signal for the optical modulator 2", degradation of received waveform of the RZ-DBPSK signal light can be effectively suppressed. In this example, by compensating variations of 40% in the duty ratio, the transmission characteristics can be improved by about 3 dB in the Q-value. Namely, by configuring the optical transmitter having excellent tolerance to the variations in the cross-point levels duty ratios of the drive signals for the optical modulators 2 and 2", it becomes possible to improve the transmission characteristics of the RZ-DBPSK signal light.

Incidentally, in the first to third embodiment, as the phase modulation format for the carrier light, there have been described the configuration examples respectively corresponding to the DBPSK modulation format, the DQPSK modulation format and the RZ-DBPSK modulation format. However, the phase modulation format to which the invention is applicable is not limited to the above examples. The invention is effective to an 8-value DPSK modulation format, a multi-value PSK modulation format of non differential type, a format combining each of the above phase modulation with an intensity modulation, or a multi-value quadrature amplitude modulation (QAM) format.

Next, there will be described a fourth embodiment of the optical transmitter according to the invention.

In the fourth embodiment, there will be described an application example in which, for the above described first embodiment, optimization of bias voltage and optimization of output amplitude of the drive signal are simultaneously performed with the optimization of cross-point level of the drive signal.

Figure 14:
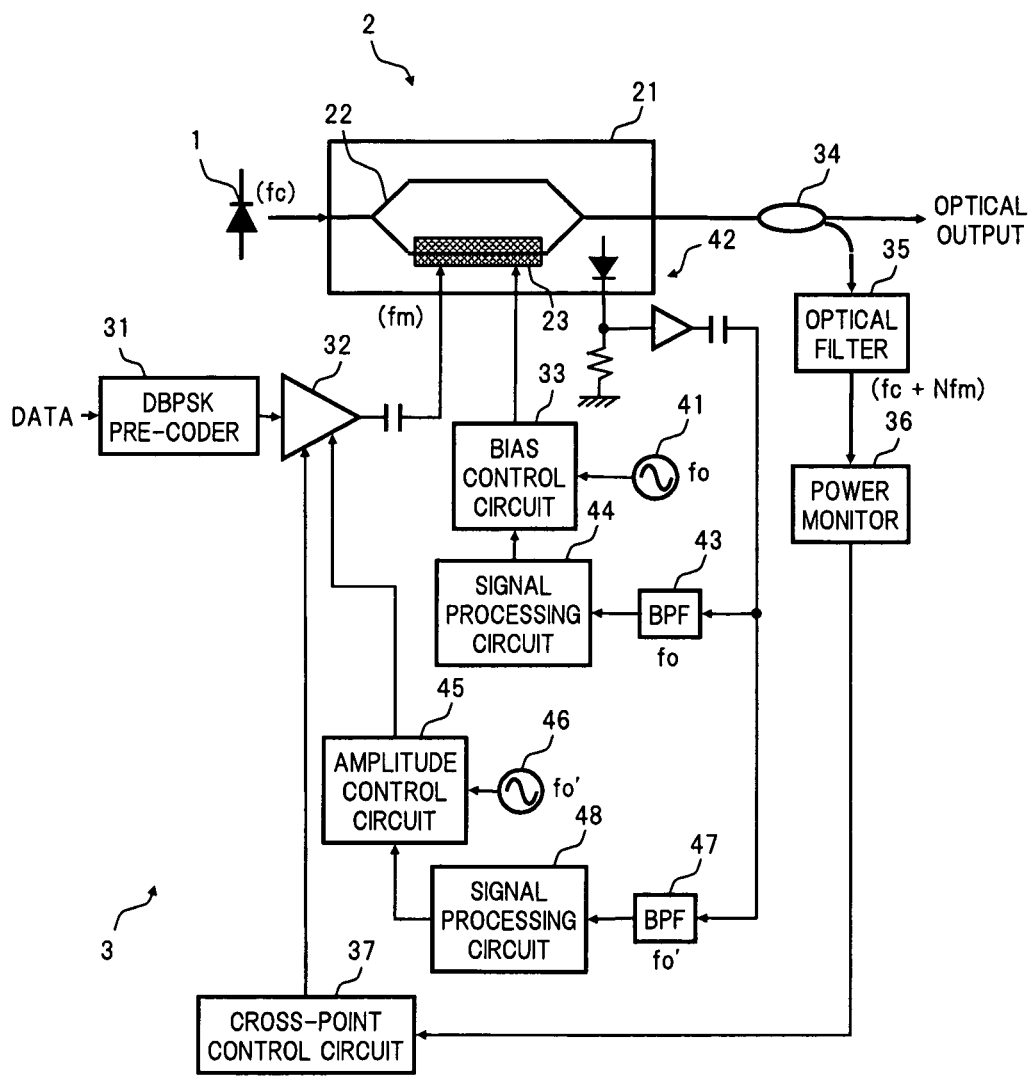
FIG. 14 is a block diagram illustrating a configuration of an optical transmitter according to a fourth embodiment.

FIG. 14 is a block diagram illustrating a configuration of the optical transmitter in the fourth embodiment.

In the optical transmitter in the present embodiment, an oscillation circuit 41, a light receiver circuit 42, a band-pass filter (BPF) 43 and a signal processing circuit 44 are additionally disposed, as a configuration for performing the optimization of bias voltage. Further, an amplitude control circuit 45, an oscillation circuit 46, a band-pass filter (BPF) 47 and a signal processing circuit 48 are additionally disposed, as a configuration for performing the optimization of output amplitude of the drive signal. Incidentally, the light receiver circuit 42 is commonly used also for the optimization of output amplitude of the drive signal.

To be specific, the oscillation circuit 41 generates a low frequency signal of frequency fo sufficiently lower than the modulation frequency fm, to output it to the bias control circuit 33. The bias control circuit 33 feeds a bias voltage superposed with the low frequency signal from the oscillation circuit 41, to the signal electrode 23 in the optical modulator 2. As a result, the low frequency signal of frequency fo is superposed in same phase on a high level and low level of a signal for driving the optical modulator 2 (signal obtained by summing up the drive signal from the driver amplifier 32 and the bias voltage from the bias control circuit 33). Further, the oscillation circuit 46 generates a low frequency signal of frequency fo' which is sufficiently lower than the modulation frequency fm and also is different from the frequency fo from the oscillation circuit 41, to output it to the amplitude control circuit 45. The amplitude control circuit 45 generates an amplitude control signal for superposing in opposite phase the low frequency signal from the oscillation circuit 46 on the high level and low level of the drive signal generated in the driver amplifier 32. As a result, a low frequency signal component of fo and a low frequency signal component of fo' can be contained in the DBPSK signal light generated in the optical modulator 2.

The light receiver circuit 42 receives a light leaked out to the outside from an output portion of the MZ optical waveguide 22 in the optical modulator 2, to convert it into an electric signal, and then, outputs the electric signal to each of the BPFs 43 and 47. Incidentally, herein, there is described one example in which by utilizing the leaked light from the MZ optical waveguide 22, a part of the DBPSK light is monitored. However, an optical branching device may be inserted onto an optical path connected to an output end of the optical modulator 2 so that a branched light from the optical branching device is received to be photo-electronically converted.

The BPF 43 extracts the low frequency signal component of fo contained in the output signal from the light receiver circuit 42, to output it to the signal processing circuit 44. The signal processing circuit 44 processes the output signal from the BPF 43, to thereby acquire phase and amplitude information of the low frequency signal component of fo, and transmits the phase and amplitude information to the bias control circuit 33. The bias control circuit 33 uses the phase and amplitude information from the signal processing circuit 44, to feedback control the level of the bias voltage so that a power of the low frequency signal component of fo contained in the DBPSK signal approaches a minimum value. As a result, the operation point of the optical modulator 2 is optimized.

Further, the BPF 47 extracts the low frequency signal component of fo' contained in the output signal from the light receiver circuit 42, to output it to the signal processing circuit 48. The signal processing circuit 48 processes the output signal from the BPF 47, to thereby acquire phase and amplitude information of the low frequency signal component of fo', and transmits the phase and amplitude information to the amplitude control circuit 45. The amplitude control circuit 45 uses the phase and amplitude information from the signal processing circuit 48, to generate an amplitude control signal for feedback controlling the output amplitude of the drive signal generated in the driver amplifier 32 so that a power of the low frequency signal component of fo' approaches a minimum value, and outputs the amplitude control signal to the driver amplifier 32. As a result, the drive signal in which not only the cross-point level but also the output amplitude are optimized, is output from the driver amplifier 32 to the signal electrode 23 in the optical modulator 2.

Figure 15:
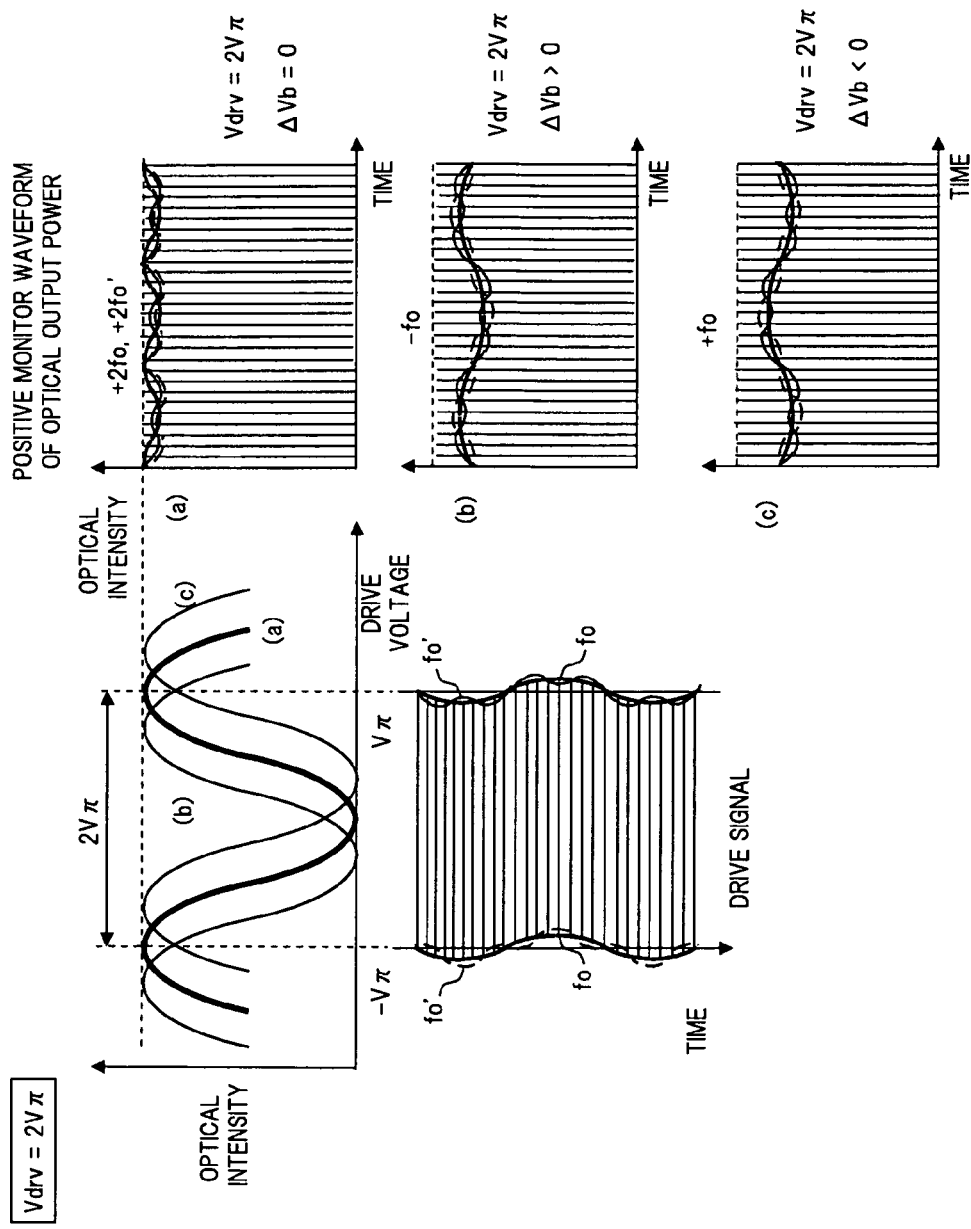
FIG. 15 is a diagram for explaining the optimization of bias voltage and output amplitude in the fourth embodiment.
Figure 16:
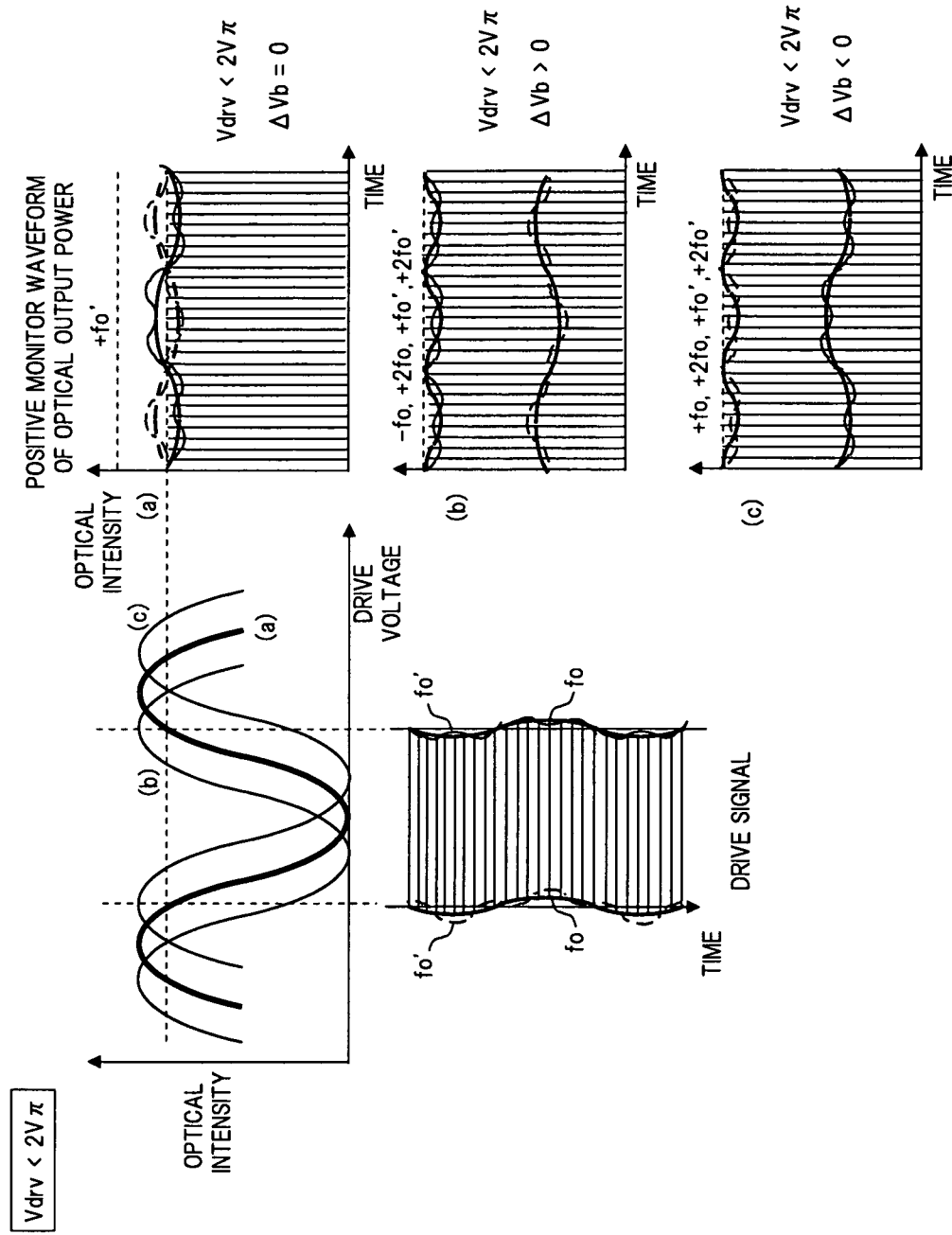
FIG. 16 is a further diagram for explaining the optimization of bias voltage and output amplitude in the fourth embodiment.
Figure 17:
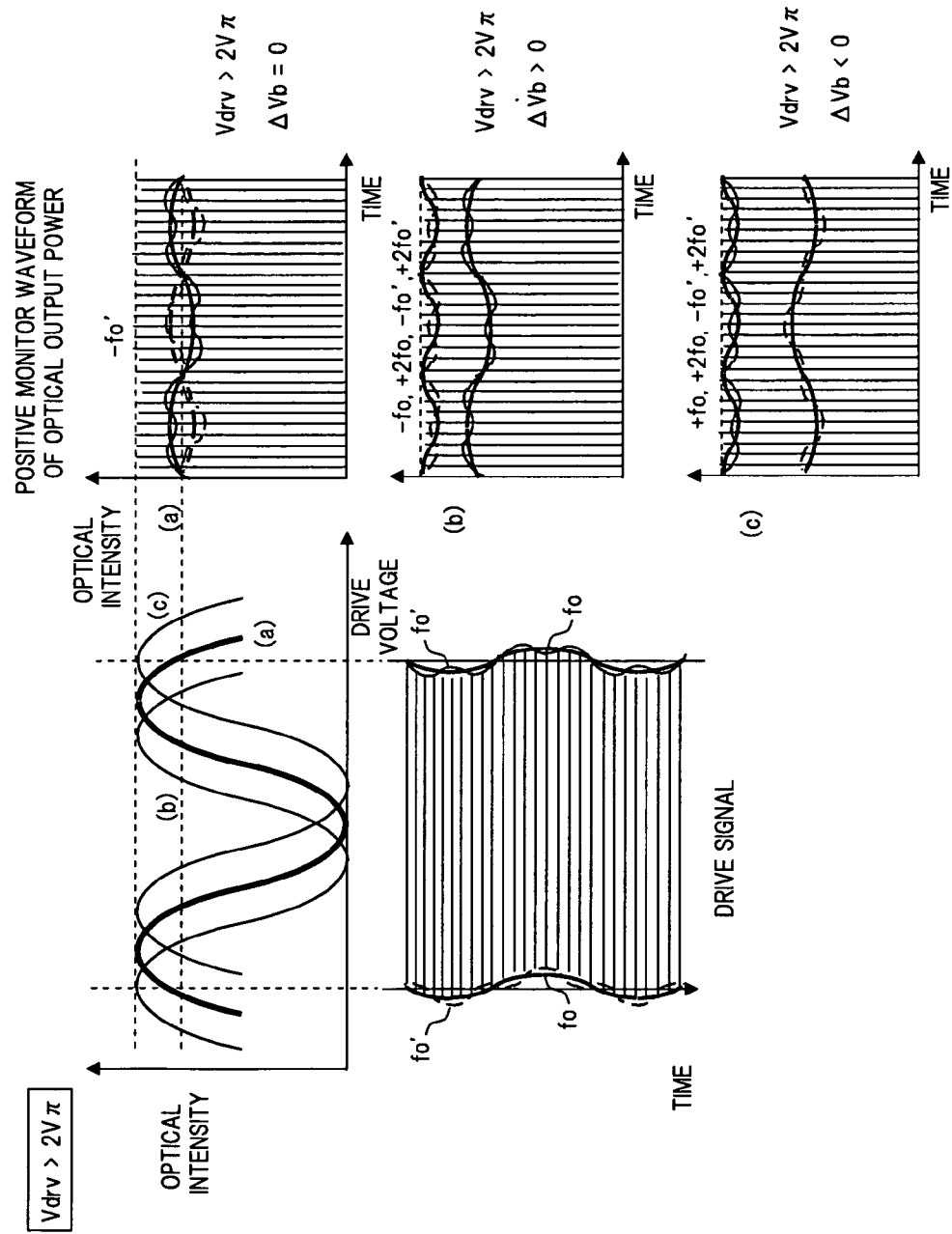
FIG. 17 is a still further diagram for explaining the optimization of bias voltage and output amplitude in the fourth embodiment.

Herein, there will be described principles of optimization of bias voltage and optimization of output amplitude of the drive signal, referring to FIG. 15 to FIG. 17. In the following description, the bias voltage is Vb and the output amplitude of the drive signal is Vdrv. FIG. 15 illustrates the case where the bias voltage Vb is changed in a state where the output amplitude Vdrv of the drive signal is coincident with $2V\pi$ of the interval of peak-trough-peak in the periodic drive voltage-to-optical intensity characteristics of the optical modulator 2. Further, FIG. 16 illustrates the case where the bias voltage Vb is changed in a state where the output amplitude of the drive signal Vdrv is smaller than $2V\pi$. Furthermore, FIG. 17 illustrates the case where the bias voltage Vb is changed in a state where the output amplitude Vdrv of the drive signal is larger than $2V\pi$.

A lower left of each drawing illustrates the waveform of the drive signal, in which the low frequency signal (bold solid line) of frequency fo to be used for the optimization of bias voltage is superposed in same phase on the high level and low level of the drive signal, and also, the low frequency signal (thin solid line and thin broken line) of frequency fo' to be used for the optimization of output amplitude is superposed in opposite phase thereon. An upper left of each drawing represents a correlation between the periodic drive voltage-to-optical intensity characteristics of the optical modulator 2 and the drive signal thereof, that is, whether or not the bias voltage Vb is in an optimum state, in which a bold line (a) corresponds to a state where the bias voltage Vb is in the optimum state, and thin lines (b) and (c) correspond to a state where the bias voltage Vb is deviated from the optimum state. If a deviation amount of the bias voltage Vb from the optimum state is expressed by $\Delta Vb$, $\Delta Vb=0$ in (a), $\Delta Vb>0$ in (b) and $\Delta Vb<0$ in (c). A right side in each drawing illustrates positive phase monitor waveforms of the DBPSK signal light output from the optical modulator 2, which correspond to the respective states (a) to (c).

Firstly, consideration is made on the case where the output amplitude of the drive signal is in the optimum state ($Vdrv=2V\pi$) illustrated in FIG. 15. In this case, if the bias voltage Vb is in the optimum state ($\Delta Vb=0$), as illustrated in the upper right stage (a), a low frequency signal component of frequency +2fo based on the low frequency signal of frequency fo; and a low frequency signal component of frequency +2fo' based on the low frequency signal of frequency fo', appear in the positive phase monitor waveform of the optical output power from the optical modulator 2. On the other hand, when the bias voltage Vb becomes larger than the optimum state ($\Delta Vb>0$), as illustrated in the medium right stage (b), only a low frequency signal component of frequency −fo based on the low frequency signal of frequency fo appears in the positive phase monitor waveform of the optical output power from the optical modulator 2, and components based on the low frequency signal of frequency fo' do not appear since they are cancelled with each other. Further, when the bias voltage Vb becomes smaller than the optimum state ($\Delta Vb<0$), as illustrated in the lower right stage (c), only a low frequency signal component of frequency +fo based on the low frequency signal of frequency fo appears in the positive phase monitor waveform of the optical output power from the optical modulator 2, and the components based on the low frequency signal of frequency fo' do not appear since they are cancelled with each other.

Next, consideration is made on the case where the output amplitude of the drive signal is smaller than the optimum state ($Vdrv<2V\pi$) illustrated in FIG. 16. In this case, if the bias voltage Vb is in the optimum state ($\Delta Vb=0$), as illustrated in the upper right stage (a), only the low frequency signal component of frequency +fo' based on the low frequency signal of frequency fo' appears in the positive monitor waveform of the optical output power from the optical modulator 2, and the components based on the low frequency signal of frequency fo do not appear since they are cancelled with each other. On the other hand, when the bias voltage Vb becomes larger than the optimum state ($\Delta Vb>0$), as illustrated in the medium right stage (b), low frequency signal components of frequencies −fo and +2fo based on the low frequency signal of frequency fo, and low frequency signal components of frequencies +fo' and +2fo' based on the low frequency signal of frequency fo', appear in the positive phase monitor waveform of the optical output power from the optical modulator 2. Further, when the bias voltage Vb becomes smaller than the optimum state ($\Delta Vb<0$), as illustrated in the lower right stage (c), low frequency signal components of frequencies +fo and +2fo based on the low frequency signal of frequency fo, and the low frequency signal components of frequencies +fo' and +2fo' based on the low frequency signal of frequency fo', appear in the positive phase monitor waveform of the optical output power from the optical modulator 2.

Next, consideration is made on the case where the output amplitude of the drive signal is larger than the optimum state ($Vdrv>2V\pi$) illustrated in FIG. 17. In this case, if the bias voltage Vb is in the optimum state ($\Delta Vb=0$), as illustrated in the upper right stage (a), only a low frequency signal component of frequency −fo' based on the low frequency signal of frequency fo' appears in the positive phase monitor waveform of the optical output power from the optical modulator 2, and components based on the low frequency signal of frequency fo do not appear since they are cancelled with each other. On the other hand, when the bias voltage Vb becomes larger than the optimum state (ΔVb>0), as illustrated in the medium right stage (b), the low frequency signal components of frequencies −fo and +2fo based on the low frequency signal of frequency fo, and the low frequency signal components of frequencies −fo' and +2fo' based on the low frequency signal of frequency fo', appear in the positive phase monitor waveform of the optical output power from the optical modulator 2. Further, when the bias voltage Vb becomes smaller than the optimum state (ΔVb<0), as illustrated in the lower right stage (c), the low frequency signal components of frequencies +fo and +2fo based on the low frequency signal of frequency fo, and the low frequency signal components of frequencies −fo' and +2fo' based on the low frequency signal of frequency fo', appear in the positive phase monitor waveform of the optical output power from the optical modulator 2.

FIG. 18 is a diagram compiling the frequencies of the low frequency signal components appearing in the positive phase monitor waveform of the optical output power from the optical modulator 2, so as to correspond to each state described above. A portion surrounded by a bold line at the center of FIG. 18 corresponds to the case where the bias voltage and the output amplitude of the drive signal are both in the optimum states, and in these states, the low frequency signal components of frequencies +2fo and +2fo' appear. In other words, it is understood that the low frequency signal components of frequencies fo and fo' do not appear. Accordingly, it becomes possible to put a driving state of the optical modulator 2 at an optimum point by feedback controlling the bias voltage and the output amplitude of the drive signal so that the powers of the low frequency signal components of frequencies fo and fo' which are contained in the DBPSK signal light output from the optical modulator 2 approach minimum values. To be specific, the bias control circuit 33 may use the information from the signal processing circuit 44 to feedback control the level of the bias voltage so that the power of the low frequency signal component of fo contained in the DBPSK signal approaches the minimum value, and also, the amplitude control circuit 45 may use the information from the signal processing circuit 48 to feedback control the output amplitude of the drive signal generated in the driver amplifier 32 so that the power of the low frequency signal component of fo' contained in the DBPSK signal light approaches the minimum value.

As described above, according to the optical transmitter in the fourth embodiment, similarly to the first embodiment, the cross-point level of the drive signal can be optimized, and also, the bias voltage and the output amplitude of the drive signal can be simultaneously optimized. Therefore, it becomes possible to stably perform the phase modulation in the optical modulator 2 with high precision.

Incidentally, in the fourth embodiment, there has been described the case where the optimization of the bias voltage and the output amplitude of the drive signal is applied to the configuration in the first embodiment. However, the bias voltage and the output amplitude of the drive signal can also be optimized in the other second and third embodiments.

Figure 19:
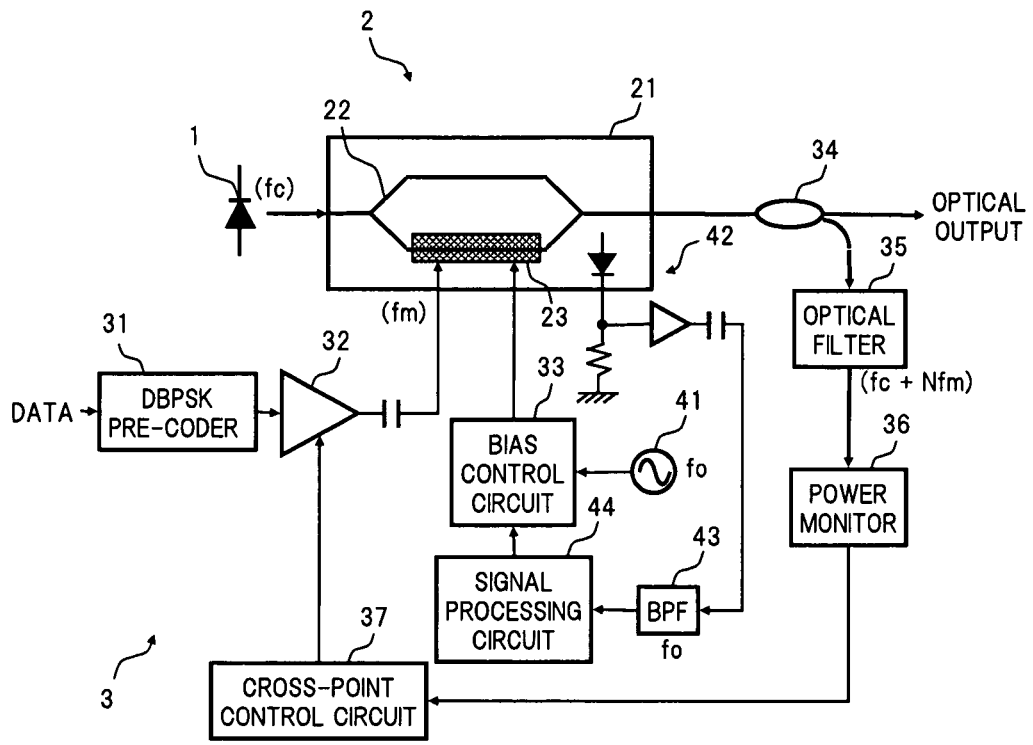
FIG. 19 is a block diagram illustrating a further configuration example related to the fourth embodiment.
Figure 20:
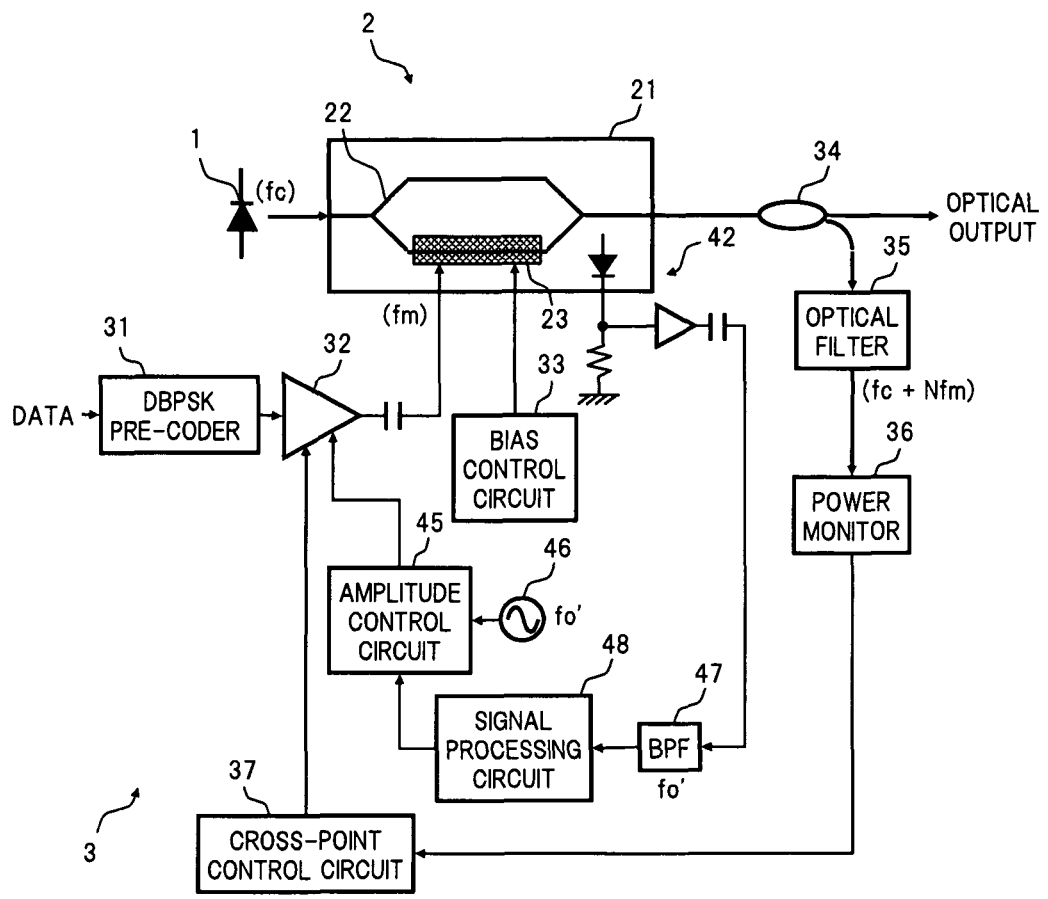
FIG. 20 is a block diagram illustrating a still further configuration example related to the fourth embodiment.

Further, in the fourth embodiment, the optimization of the cross-point level of the drive signal is performed, and also, both of the optimization of the bias voltage and the optimization of the output amplitude of the drive signal are simultaneously performed. However, it is surely possible to perform either the optimization of the bias voltage or the optimization of the output amplitude of the drive signal, according to use conditions and the like of the optical transmitter. FIG. 19 illustrates a configuration example for when the optimization of the cross-point level of the drive signal is performed, and also, the optimization of the bias voltage is performed. FIG. 20 illustrates a configuration example for when the optimization of the cross-point level of the drive signal is performed, and also, the optimization of the output amplitude of the drive signal is performed.

Next, there will be described a fifth embodiment of the optical transmitter.

In each of the first to fourth embodiments, the monitor light branched from the output light of the optical modulator is fed to the optical filter, and some spectrum component of the monitor light, which is distant from the carrier frequency fc by integral multiple of the modulation frequency fm, is extracted, and then, the cross-point level of the drive signal or the duty ratio thereof is optimized based on the power of the spectrum component. In the fifth embodiment, as a measure alternative to the above optical filter, there will be described a modified example in which the output light from the light source and the output light from the optical modulator are multiplexed so that a beat element of modulation frequency fm is generated, and then, the cross-point level is optimized based on the beat element of modulation frequency fm.

Figure 21:
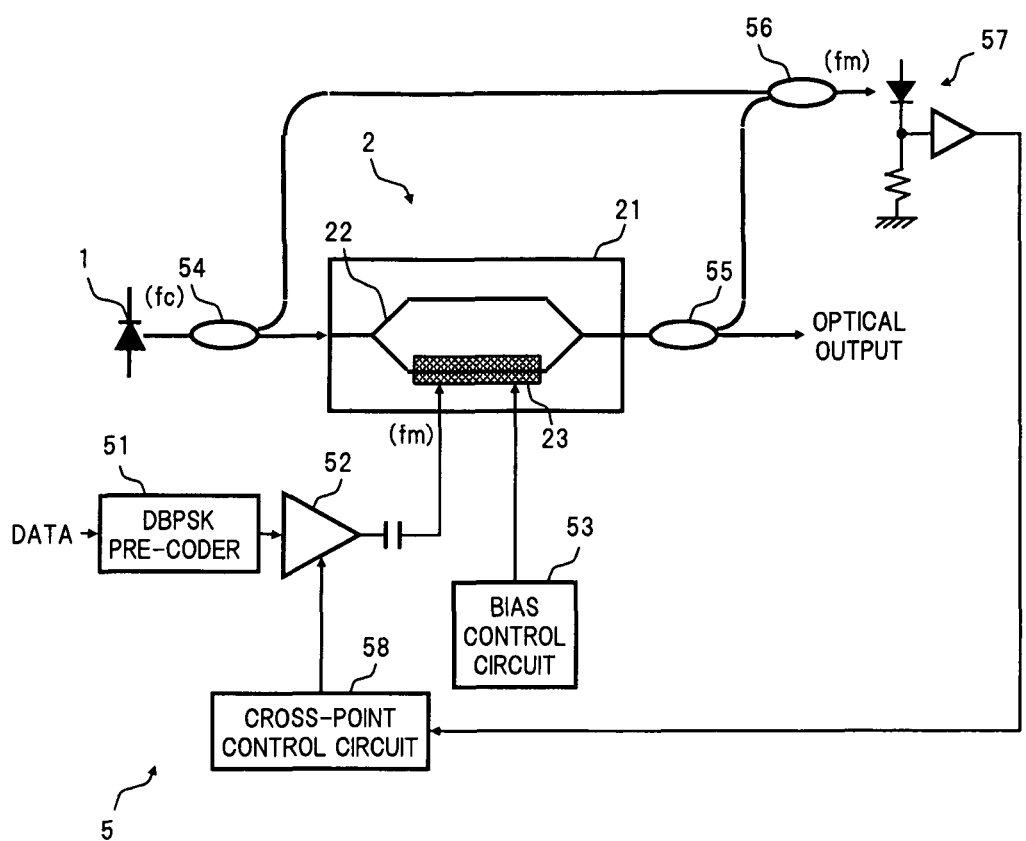
FIG. 21 is a block diagram illustrating a configuration of an optical transmitter according to the fifth embodiment.

FIG. 21 is a block diagram illustrating a configuration of the optical transmitter in the fifth embodiment.

In FIG. 21, the optical transmitter in the present embodiment comprises, for example: a light source 1 and an optical modulator which are similar to those in the first embodiment; and a driving apparatus 5 corresponding to the beat element of modulation frequency fm.

The driving apparatus 5 comprises: a DBPSK pre-coder 51; a driver amplifier 52; a bias control circuit 53; optical branching devices 54 and 56; an optical multiplexer 56; a beat detecting section 57; and a cross-point control circuit 58. Incidentally, the DBPSK pre-coder 51, the driver amplifier 52 and the bias control circuit 53 are similar to the DBPSK pre-coder 31, the driver amplifier 32 and the bias control circuit 33 in the above described first embodiment, and therefore, the description thereof is omitted here.

The optical branching device 54 is inserted between the light source 1 and the input terminal of the optical modulator 2, and branches a part of the carrier light output from the light source 1 to output the branched light to the optical multiplexer 56. The optical branching device 55 branches a part of the DBPSK light output from the optical modulator 2 to output the branched light to the optical multiplexer 56.

The optical multiplexer 56 multiplexes the output lights from the optical branching devices 54 and 55 into one, to thereby generate a light containing the beat element of modulation frequency fm to output it to the beat detecting section 57.

The beat detecting section 57 converts the output light from the optical multiplexer 56 into an electric signal by using a light receiving element or the like, and detects a power of the beat element of modulation frequency fm based on the electric signal to transmit the detection result to the cross-point control circuit 58.

The cross-point control circuit 58 feedback controls a control voltage to be applied on a cross-point control terminal provided in the driver amplifier 52 based on the detection result in the beat detecting section 57 so that the power of the beat element of modulation frequency fm approaches a minimum value, to thereby optimize the cross-point level of the drive signal. This optimization of the cross-point level is performed in accordance with a principle basically similar to that described in the above first embodiment. Namely, the optimization of the cross-point level is performed, focusing on the fact that when the cross-point level is deviated from the optimum state, the beat element of modulation frequency fm is increased with the increase of the deviation amount.

In the configuration described above, by multiplexing the respective output lights from the light source 1 and the optical modulator 2 to generate the beat element of modulation frequency fm, it is possible to eliminate an influence of frequency (wavelength) variations in the light source 1. In the configuration of the above first embodiment, if frequency (wavelength) variations in the light source 1 are increased, the transmission bandwidth of the optical filter 35 needs to be widened, and therefore, there is a possibility of degradation in control precision of the cross-point level. Accordingly, the configuration in the present embodiment is especially effective for the case where the light source 1 with relatively large frequency (wavelength) variations is used.

Incidentally, in the fifth embodiment, there has been described one example in which, in the configuration corresponding to the DBPSK modulation format similar to the first embodiment, the cross-point level is optimized by utilizing the beat element of modulation frequency fm. However, it is also possible to apply the configuration utilizing the beat element of modulation frequency fm to each of other second to fourth embodiment.

All examples and conditional language recited herein are intended for pedagogical purposes to aid the reader in understanding the principles of the invention and the concepts contributed by the inventor for furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A driving apparatus for driving an optical modulator corresponding to a phase modulation format, comprising:
    a driver configured to supply a drive signal having a frequency in accordance with input data to the optical modulator;
    an output light divider configured to divide a part of a phase modulated light output from the optical modulator;
    an optical extracting section configured to extract some optical component of the light divided in the output light divider which is distant from a frequency of a carrier light input to the optical modulator by integral multiple of a frequency of the drive signal;
    a power detector configured to detect a power of the optical component extracted in the optical extracting section; and
    a controller configured to control the driver based on the power detected in the power detector.

2. A driving apparatus according to claim 1,
    wherein the controller is configured to control the setting of a duty ratio or a cross-point level in the driver, so that the power detected in the power detector approaches a minimum value.

3. A driving apparatus according to claim 1,
    wherein the extracting section includes an optical filter of which center frequency of a transmission band is on a position distant from the frequency of the carrier light input to the optical modulator by integral multiple of the frequency of the drive signal.

4. A driving apparatus according to claim 3,
    wherein the optical filter has transmission bandwidth according to a variation amount in the frequency of the carrier light.

5. A driving apparatus according to claim 2,
    wherein, when the driver is configured to supply a clock signal synchronized with the input data to the optical modulator,
    the extracting section includes an optical filter of which center frequency of a transmission band is on a position distant from the frequency of the carrier light input to the optical modulator by even number multiple of a frequency of the clock signal.

6. A driving apparatus according to claim 1, further comprising:
    an input light divider configured to divide a part of the carrier light input to the optical modulator,
    wherein the extracting section is configured to multiplex a light divided in the input light divider and the light divided in the output light divider, to output a light containing a beat element corresponding to the frequency of the drive signal, and
    the power detector is configured to detect a power of the beat element using the output light from the extracting section.

7. A driving apparatus according to claim 1, further comprising:
    a bias controller configured to supply a bias voltage to the optical modulator, and also, to regulate the bias voltage based on a state of the phase modulated light output from the optical modulator to control an operation point of the optical modulator.

8. A driving apparatus according to claim 7,
    wherein the bias controller comprises:
    an oscillation circuit configured to generate a low frequency signal having a frequency lower than the frequency of the drive signal;
    a bias control circuit configured to supply, to the optical modulator, a bias voltage on which the low frequency signal output from the oscillation circuit is superposed, and to superpose the low frequency signal, in same phase, on a high level of the signal for driving the optical modulator and on a low level thereof;
    a light receiver circuit configured to receive a part of the phase modulated light output from the optical modulator to convert it into an electric signal;
    a band-pass filter configured to extract a low frequency signal component corresponding to the frequency of the low frequency signal from an output signal from the light receiver circuit; and
    a signal processing circuit configured to acquire phase and amplitude information of the low frequency signal component by using an output signal from the band-pass filter, and
    the bias control circuit is configured to use the information from the signal processing circuit to control a level of the bias voltage so that a power of the low frequency signal component approaches a minimum value.

9. A driving apparatus according to claim 1, further comprising:
    a driving amplitude controller configured to control output amplitude of the drive signal.

10. A driving apparatus according to claim 9,
    wherein the driving amplitude controller comprises:
    an oscillation circuit configured to generate a low frequency signal having a frequency lower than the frequency of the drive signal;
    an amplitude control circuit configured to superpose the low frequency signal output from the oscillation circuit in opposite phase on the high level of the drive signal and on the low level thereof;

a light receiver circuit configured to receive a part of the phase modulated light output from the optical modulator to convert it into an electric signal;

a band-pass filter configured to extract the low frequency signal component corresponding to the frequency of the low frequency signal from an output signal from the light receiving circuit; and a signal processing circuit configured to use an output signal from the band-pass filter to acquire the phase and amplitude information of the low frequency signal component, and the amplitude control circuit is configured to use the information from the signal processing circuit to control an amplitude setting voltage in the driver so that the power of the low frequency signal component approaches the minimum value.

11. A driving apparatus according to claim 1,
wherein the driver is configured to supply a drive signal corresponding to a multi-value differential phase shift keying modulation format to the optical modulator.

12. A driving apparatus according to claim 1,
wherein the driver is configured to supply a drive signal corresponding to a multi-value phase shift keying modulation format to the optical modulator.

13. A driving apparatus according to claim 1,
wherein the driver is configured to supply a drive signal corresponding to a multi-value quadrature amplitude modulation format to the optical modulator.

14. An optical transmitter comprising:
a driving apparatus recited in claim 1;
a light source configured to generate a carrier light; and
an optical modulator configured to phase modulate the carrier light output from the light source in accordance with a drive signal supplied from the driving apparatus.

15. A driving method for driving an optical modulator corresponding to a phase modulation format, the driving method comprising:
supplying a drive signal having a frequency in accordance with input data to the optical modulator;
dividing a part of a phase modulated light output from the optical modulator;
extracting some optical component of the divided light, which is distant from a frequency of a carrier light input to the optical modulator by integral multiple of a frequency of the drive signal;
detecting a power of the extracted optical component; and
controlling a duty ratio of the drive signal or a cross-point level thereof so that the detected power approaches a minimum value.

16. A driving apparatus according to claim 2,
wherein the extracting section includes an optical filter of which center frequency of a transmission band is on a position distant from the frequency of the carrier light input to the optical modulator by integral multiple of the frequency of the drive signal.

* * * * *